US012602942B2

(12) United States Patent
Gusarov et al.

(10) Patent No.: US 12,602,942 B2
(45) Date of Patent: Apr. 14, 2026

(54) MODEL FINE-TUNING FOR AUTOMATED AUGMENTED REALITY DESCRIPTIONS

(71) Applicant: Snap Inc., Santa Monica, CA (US)

(72) Inventors: Maksim Gusarov, Santa Monica, CA (US); Kwot Sin Lee, Weehawken, NJ (US); Patrick Poirson, Gilbert, AZ (US); Chen Wang, Great Neck, NY (US)

(73) Assignee: Snap Inc., Santa Monica, CA (US)

( * ) Notice: Subject to any disclaimer, the term of this patent is extended or adjusted under 35 U.S.C. 154(b) by 245 days.

(21) Appl. No.: 18/502,868

(22) Filed: Nov. 6, 2023

(65) Prior Publication Data

US 2025/0148816 A1 May 8, 2025

(51) Int. Cl.
*G06V 20/70* (2022.01)
*G06F 40/40* (2020.01)
(Continued)

(52) U.S. Cl.
CPC ........... *G06V 20/70* (2022.01); *G06N 3/0455* (2023.01); *G06T 11/00* (2013.01); *G06V 10/774* (2022.01);
(Continued)

(58) Field of Classification Search
CPC ...... G06V 20/70; G06V 10/774; G06V 20/20; G06V 20/46; G06V 10/82; G06N 3/0455; G06T 11/00; G06F 40/40
See application file for complete search history.

(56) References Cited

U.S. PATENT DOCUMENTS

2004/0017933 A1* 1/2004 Lestideau ................. G06T 7/20
                                                    382/103
2007/0192863 A1 8/2007 Kapoor et al.
(Continued)

FOREIGN PATENT DOCUMENTS

CN        103929653 A      7/2014
WO   WO-2025101496 A1     5/2025
WO   WO-2025101514 A1     5/2025

OTHER PUBLICATIONS

Hu, Edward, "LORA: Low-Rank Adaptation of Large Language Models", [Online]. Retrieved from the Internet: <URL: https://arxiv.org/abs/2106.09685>, (Oct. 16, 2021), 26 pgs.
(Continued)

*Primary Examiner* — Grace Q Li
(74) *Attorney, Agent, or Firm* — Schwegman Lundberg & Woessner, P.A.

(57) ABSTRACT
A second input image is generated by applying a target augmented reality (AR) effect to a first input image. The first input image and the second input image are provided to a first visual-semantic machine learning model to obtain output describing at least one feature of the target AR effect. The first visual-semantic machine learning model is fine-tuned from a second visual-semantic machine learning model by using training samples. Each training sample comprises a first training image, a second training image, and a training description of a given AR effect. The second training image is generated by applying the given AR effect to the first training image. A description of the target AR effect is selected based on the output of the visual-semantic machine learning model. The description of the target AR effect is stored in association with an identifier of the target AR effect.

20 Claims, 18 Drawing Sheets

(51) Int. Cl.

| | |
|---|---|
| *G06N 3/0455* | (2023.01) |
| *G06T 11/00* | (2006.01) |
| *G06V 10/774* | (2022.01) |
| *G06V 20/20* | (2022.01) |
| *G06V 20/40* | (2022.01) |

(52) U.S. Cl.
CPC .............. *G06V 20/20* (2022.01); *G06V 20/46* (2022.01); *G06F 40/40* (2020.01)

(56) References Cited

U.S. PATENT DOCUMENTS

| | | | |
|---|---|---|---|
| 2010/0162175 A1 | 6/2010 | Lee et al. | |
| 2012/0027290 A1 | 2/2012 | Baheti et al. | |
| 2014/0244749 A1* | 8/2014 | Martin | H04N 21/25891 |
| | | | 709/204 |
| 2019/0156177 A1 | 5/2019 | Abdallah et al. | |
| 2021/0073252 A1 | 3/2021 | Guo et al. | |
| 2021/0203727 A1 | 7/2021 | Pounds et al. | |
| 2022/0058393 A1* | 2/2022 | Calvert | H04N 23/62 |
| 2022/0405489 A1 | 12/2022 | Radkoff et al. | |
| 2023/0111356 A1 | 4/2023 | Jain et al. | |
| 2023/0153522 A1 | 5/2023 | Cho et al. | |
| 2023/0237802 A1* | 7/2023 | Falendysz | B64C 39/024 |
| | | | 382/104 |
| 2023/0274481 A1 | 8/2023 | Gustman et al. | |
| 2024/0096093 A1 | 3/2024 | Chiu et al. | |
| 2024/0249331 A1 | 7/2024 | Jain et al. | |
| 2024/0256764 A1 | 8/2024 | Maschmeyer et al. | |
| 2024/0296425 A1 | 9/2024 | Rosenkranz et al. | |
| 2024/0320310 A1 | 9/2024 | Callegari et al. | |
| 2024/0320432 A1 | 9/2024 | Maschmeyer et al. | |
| 2024/0331313 A1* | 10/2024 | Tsuchiya | G06V 10/44 |
| 2024/0355104 A1* | 10/2024 | Alfassy | G06V 30/19173 |
| 2024/0362815 A1 | 10/2024 | Joachim et al. | |
| 2024/0419246 A1 | 12/2024 | Ullrich et al. | |
| 2024/0420458 A1* | 12/2024 | Jin | G06V 10/806 |
| 2025/0131753 A1* | 4/2025 | Fan | G06V 10/771 |
| 2025/0139387 A1 | 5/2025 | Jang et al. | |
| 2025/0148218 A1 | 5/2025 | Gusarov et al. | |

OTHER PUBLICATIONS

Kuo, Chris, "Fine-tuning a GPT-LoRA", [Online]. Retrieved from the Internet: <URL: https://dataman-ai.medium.com/fine-tune-a-gpt-lora-e9b72ad4ad3>, (Jun. 19, 2023), 15 pgs.

Li, Junnan, "BLIP-2: Bootstrapping Language—Image Pre-training with Frozen Image Encoders and Large Language Models", [Online]. Retrieved from the Internet: <URL: https://arxiv.org/abs/2301.12597>, (May 1, 2023), 13 pgs.

"U.S. Appl. No. 18/502,679, Response filed Oct. 14, 2025 to Non Final Office Action mailed Jul. 17, 2025", 10 pgs.

"U.S. Appl. No. 18/502,679, Non Final Office Action mailed Jul. 17, 2025", 26 pgs.

Hu, Y, et al., "Promptcap: Prompt-guided task-aware image captioning", arXiv preprint arXiv:2211.09699v4, (Aug. 17, 2023), 17 pgs.

"International Application Serial No. PCT/US2024/054537, International Search Report mailed Feb. 18, 2025", 3 pgs.

"International Application Serial No. PCT/US2024/054537, Written Opinion mailed Feb. 18, 2025", 3 pgs.

"International Application Serial No. PCT/US2024/054568, International Search Report mailed Jan. 8, 2025", 4 pgs.

"International Application Serial No. PCT/US2024/054568, Written Opinion mailed Jan. 8, 2025", 5 pgs.

Linli, Yao, et al., "Image Difference Captioning with Pre-training and Contrastive Learning", arxiv.org, Cornell University Library, 201 Olin Library Cornell University Ithaca, NY 14853, (Feb. 9, 2022), 13 pgs.

Park, Dong Huk, et al., "Robust Change Captioning", IEEE/CVF International Conference on Computer Vision (ICCV), IEEE, (Oct. 27, 2019), 10 pgs.

Xiaonan, Lu, et al., "Viewpoint Integration and Registration with Vision Language Foundation Model for Image Change Understanding", arxiv.org, Cornell University Library, 201 Olin Library Cornell University Ithaca, NY 14853, (Sep. 15, 2023), 12 pgs.

* cited by examiner 104    124    100

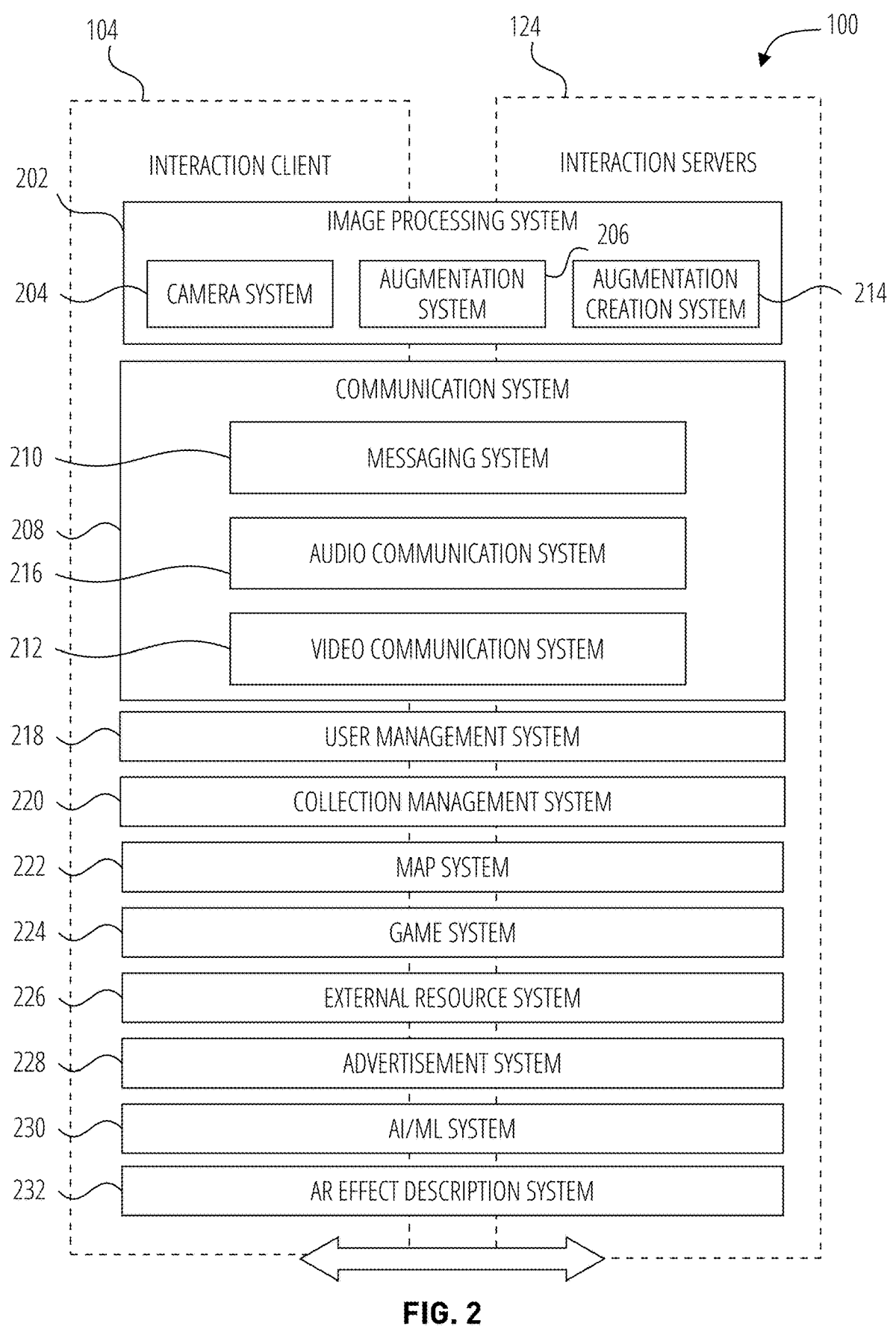

INTERACTION CLIENT    INTERACTION SERVERS

202

IMAGE PROCESSING SYSTEM    206

204    CAMERA SYSTEM    AUGMENTATION SYSTEM    AUGMENTATION CREATION SYSTEM    214

COMMUNICATION SYSTEM

210    MESSAGING SYSTEM 208
216    AUDIO COMMUNICATION SYSTEM

212    VIDEO COMMUNICATION SYSTEM

218    USER MANAGEMENT SYSTEM

220    COLLECTION MANAGEMENT SYSTEM

222    MAP SYSTEM

224    GAME SYSTEM

226    EXTERNAL RESOURCE SYSTEM

228    ADVERTISEMENT SYSTEM

230    AI/ML SYSTEM

232    AR EFFECT DESCRIPTION SYSTEM

FIG. 2

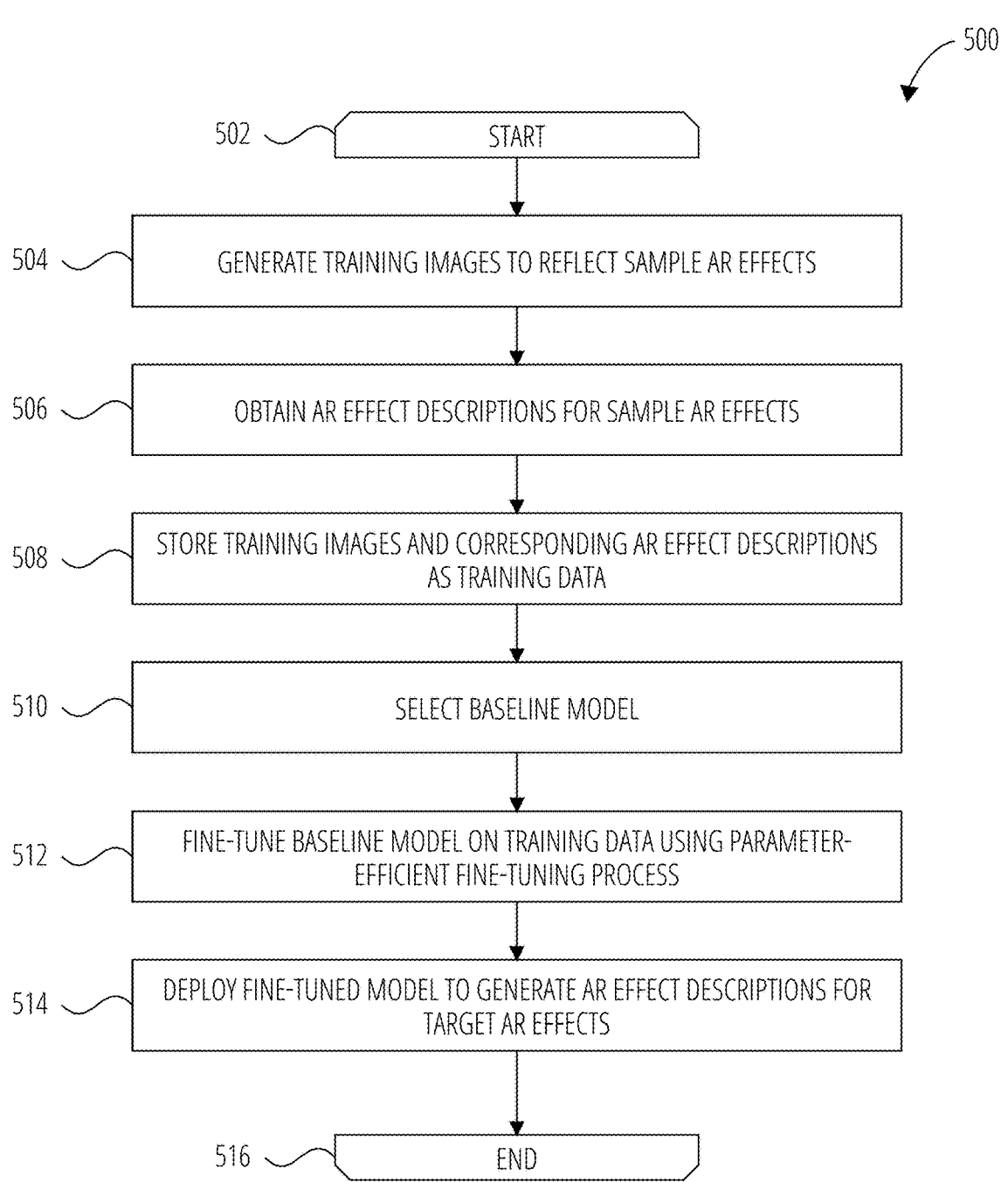

502 — START

504 — GENERATE TRAINING IMAGES TO REFLECT SAMPLE AR EFFECTS

506 — OBTAIN AR EFFECT DESCRIPTIONS FOR SAMPLE AR EFFECTS

508 — STORE TRAINING IMAGES AND CORRESPONDING AR EFFECT DESCRIPTIONS AS TRAINING DATA

510 — SELECT BASELINE MODEL

512 — FINE-TUNE BASELINE MODEL ON TRAINING DATA USING PARAMETER-EFFICIENT FINE-TUNING PROCESS

514 — DEPLOY FINE-TUNED MODEL TO GENERATE AR EFFECT DESCRIPTIONS FOR TARGET AR EFFECTS

516 — END

FIG. 5

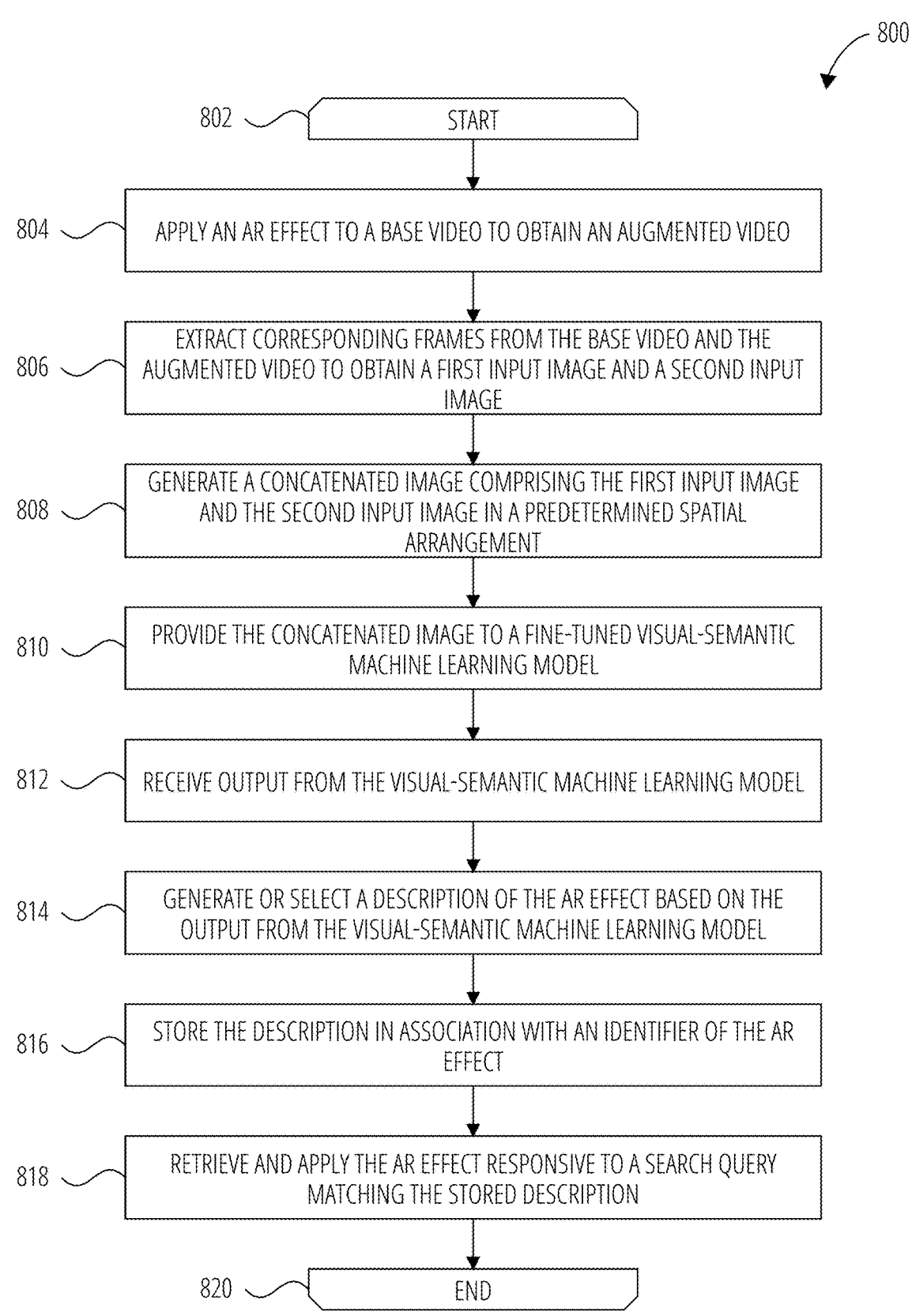

*800*

802 — START

804 — APPLY AN AR EFFECT TO A BASE VIDEO TO OBTAIN AN AUGMENTED VIDEO

806 — EXTRACT CORRESPONDING FRAMES FROM THE BASE VIDEO AND THE AUGMENTED VIDEO TO OBTAIN A FIRST INPUT IMAGE AND A SECOND INPUT IMAGE

808 — GENERATE A CONCATENATED IMAGE COMPRISING THE FIRST INPUT IMAGE AND THE SECOND INPUT IMAGE IN A PREDETERMINED SPATIAL ARRANGEMENT

810 — PROVIDE THE CONCATENATED IMAGE TO A FINE-TUNED VISUAL-SEMANTIC MACHINE LEARNING MODEL

812 — RECEIVE OUTPUT FROM THE VISUAL-SEMANTIC MACHINE LEARNING MODEL

814 — GENERATE OR SELECT A DESCRIPTION OF THE AR EFFECT BASED ON THE OUTPUT FROM THE VISUAL-SEMANTIC MACHINE LEARNING MODEL

816 — STORE THE DESCRIPTION IN ASSOCIATION WITH AN IDENTIFIER OF THE AR EFFECT

818 — RETRIEVE AND APPLY THE AR EFFECT RESPONSIVE TO A SEARCH QUERY MATCHING THE STORED DESCRIPTION

820 — END

FIG. 8

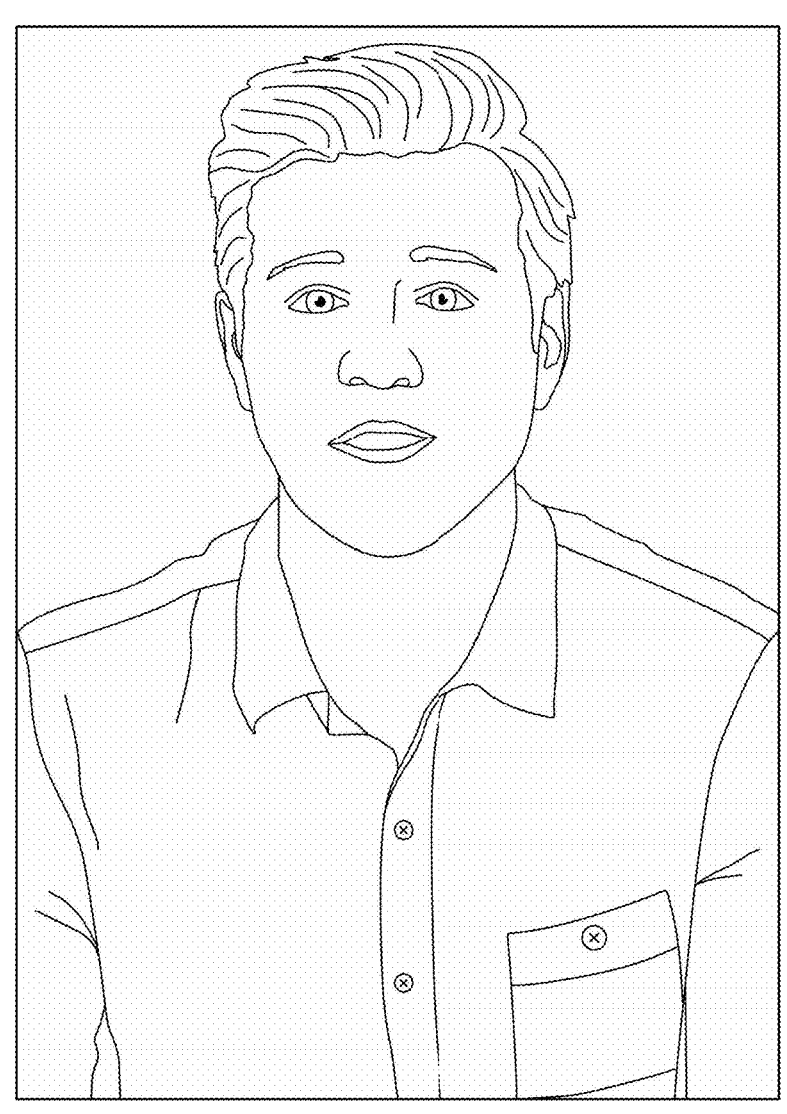
FIG. 9

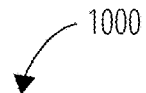
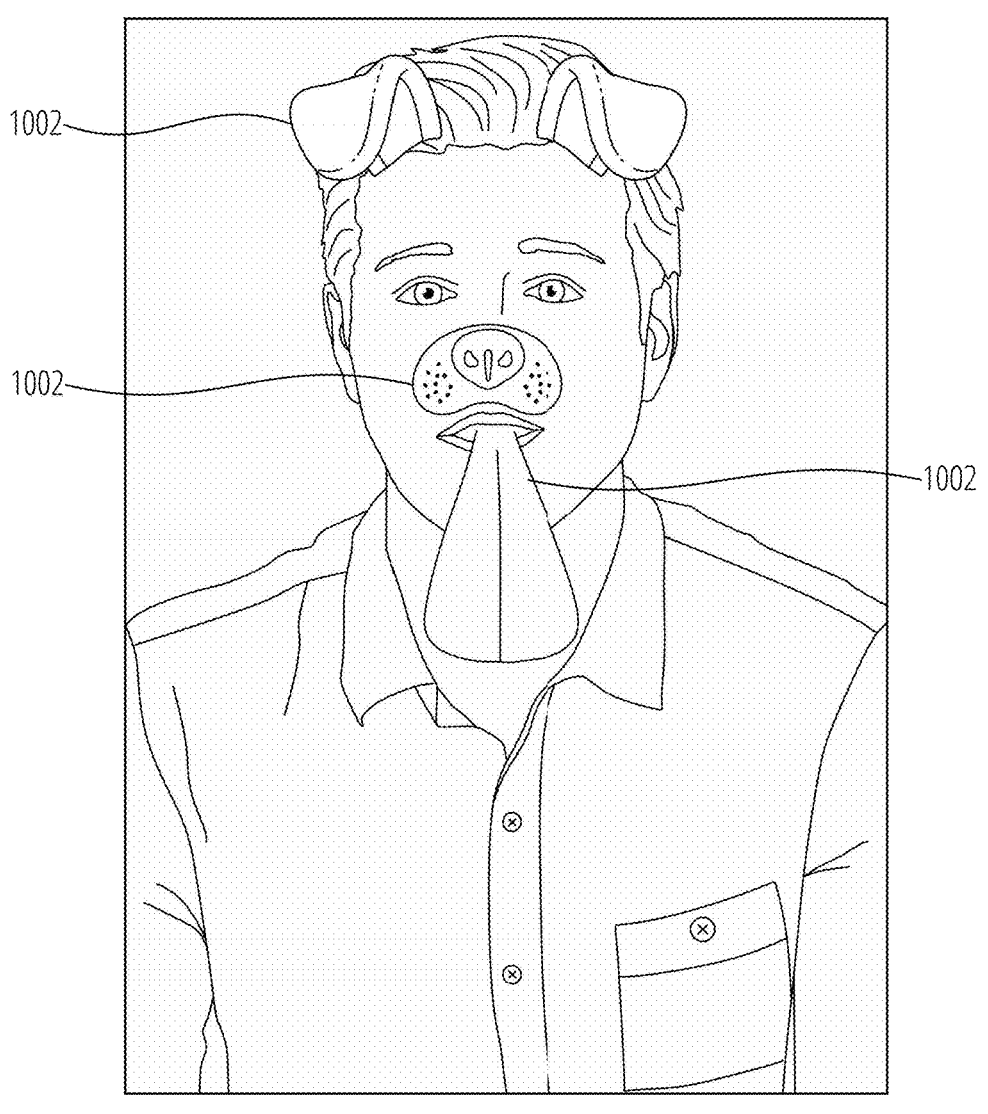
1002
1002
1002
FIG. 10

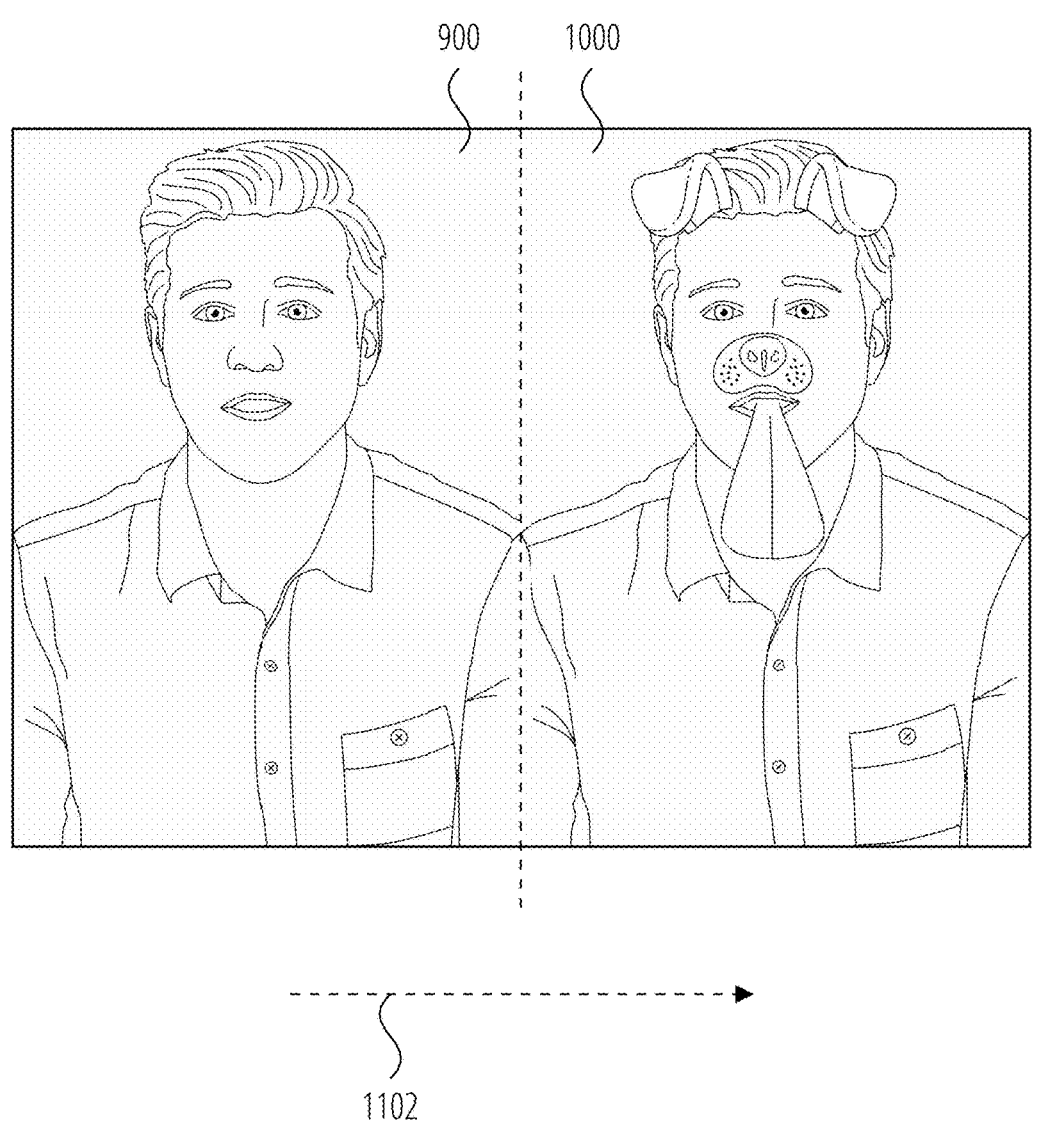
FIG. 11

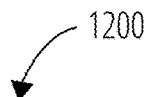
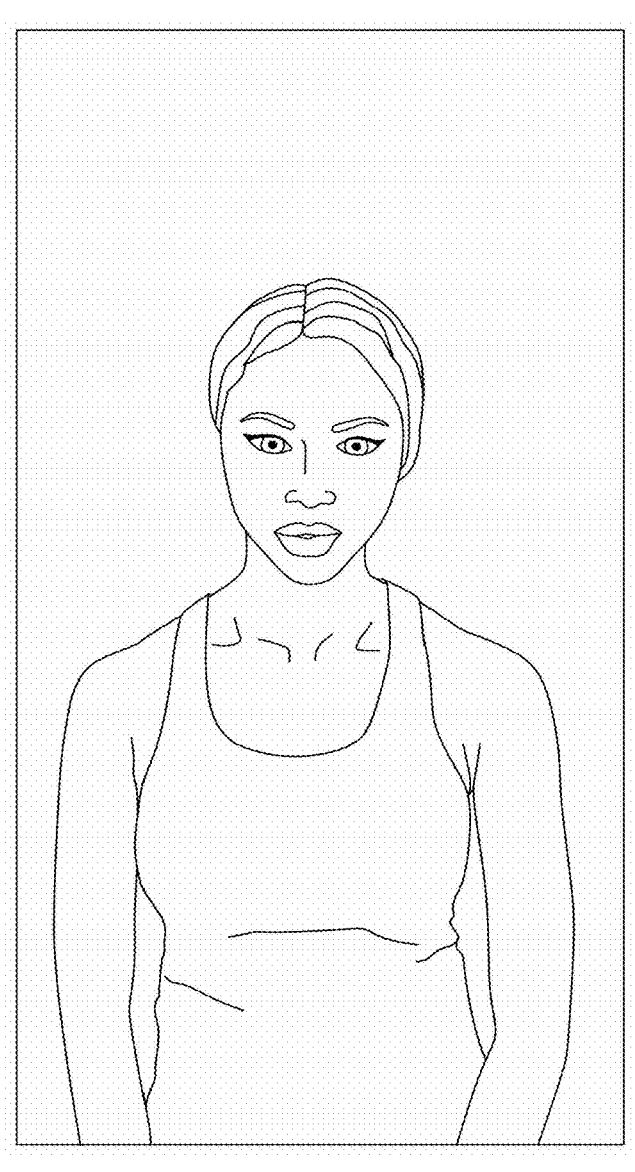
FIG. 12

1300

1302

1302

MODEL FINE-TUNING FOR AUTOMATED AUGMENTED REALITY DESCRIPTIONS

TECHNICAL FIELD

Subject matter disclosed herein relates, generally, to augmented reality (AR) technology. More specifically, but not exclusively, subject matter disclosed herein relates to the generation of descriptions of AR effects for use in an interaction system.

BACKGROUND

Some interaction applications enable users to apply AR effects, also referred to as augmentations, to content items (e.g., images or videos captured by users). AR effects may be stored in an interaction system together with metadata, such as keywords. For example, the interaction system may link AR effects to respective keywords to make it easier for a user of an interaction application to search for and apply a desired AR effect.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 2 is a diagrammatic representation of an interaction system, according to some examples, that has both client-side and server-side functionality.

FIG. 5 is a flowchart illustrating a method suitable for fine-tuning of a visual-semantic machine learning model, according to some examples.

FIG. 8 is a flowchart illustrating a method suitable for generating a description of an AR effect, according to some examples.

FIG. 9 shows a first image, according to some examples.

FIG. 10 shows a second image that is generated by applying an AR effect to the first image of FIG. 9, according to some examples.

FIG. 11 shows a concatenated image that is generated by concatenating the first image of FIG. 9 and the second image of FIG. 10 based on a predetermined spatial arrangement, according to some examples.

FIG. 12 shows a first image, according to some examples.

DETAILED DESCRIPTION

Figure 1:
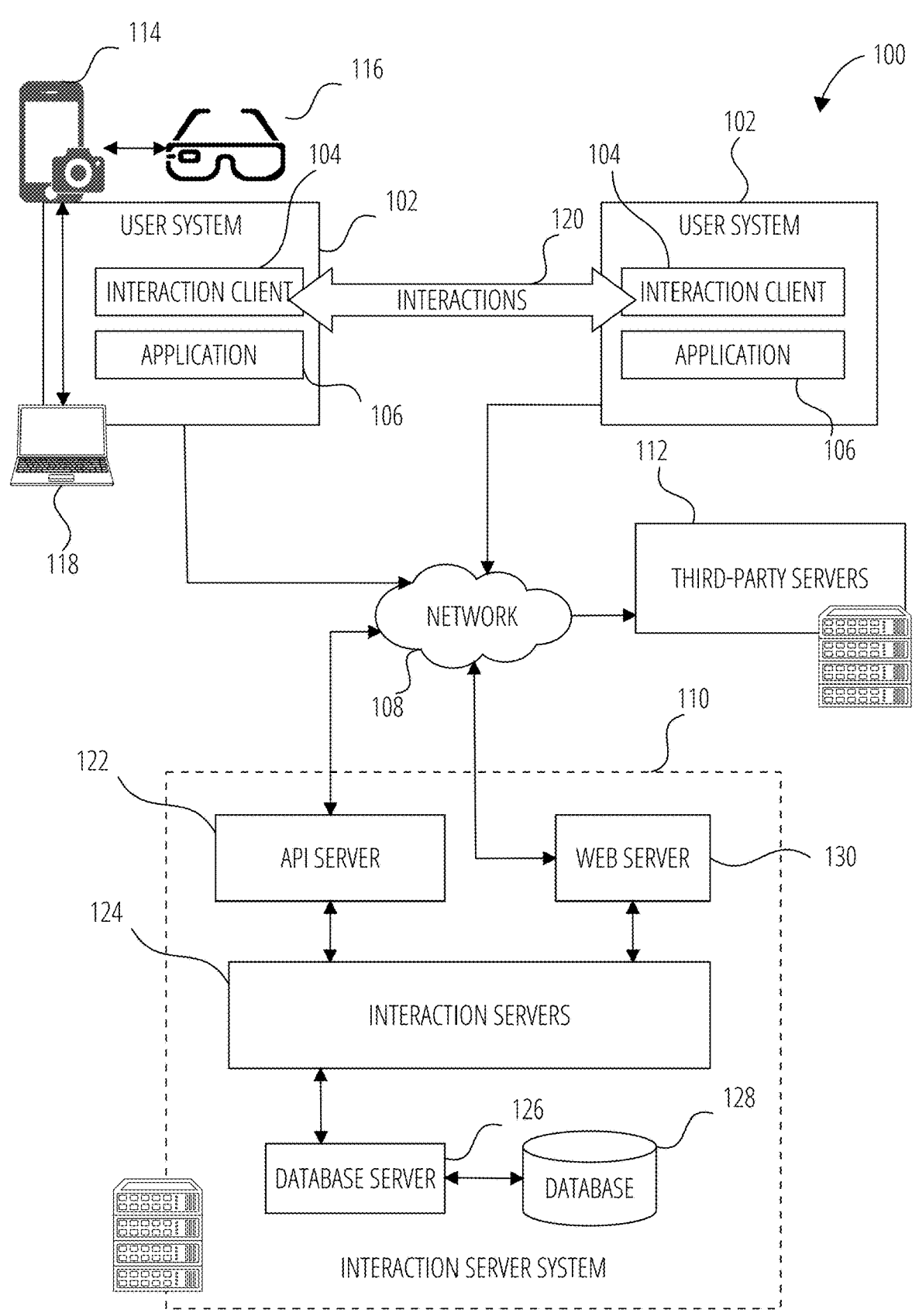
FIG. 1 is a diagrammatic representation of a networked environment in which the present disclosure may be deployed, according to some examples.

As used in this disclosure, the term "AR effect" refers to an effect, modification, removal, addition, or combination thereof, that alters an image or sequence of images (e.g., a video clip comprising a sequence of image frames) when compared to what would be observed if captured and presented without any such effect, modification, removal, or addition. An AR effect can also be referred to as an "augmentation." Examples of AR effects may include two-dimensional or three-dimensional effects, filters, lenses, media overlays (e.g., text, color, or image overlays), AR experiences, extended reality (XR) experiences, or combinations thereof.

AR effects can render special, interesting, entertaining, or useful augmentations on content items, such as images or videos. For example, a user of an interaction application may select an AR effect to be applied to video content captured using a camera of a user device. The AR effect may then be applied in real-time (e.g., applied to an object presented in a camera feed interface before or during capturing of the content) or after the content has been captured (e.g., applied to a video file retrieved from a storage location associated with the user device).

An AR effect can, for example, render an overlay onto the face of a person, render a virtual object in a specific position relative to a real-world object, or change the colors of an image. In some cases, the AR effect may include a change in the format or style of a content item, e.g., applying a "green screen" effect to a video captured by a user. In some cases, an AR effect may result in both aesthetic and format changes.

As mentioned, AR effects may be stored in an interaction system together with metadata, such as keywords or "tags." In some cases, the metadata of a particular AR effect may provide a useful description of the AR effect to facilitate searching for AR effects, generating AR effect recommendations, ranking AR effects, and so forth. However, an interaction system may support a large number of AR effects (e.g., thousands or even millions of different AR effects), which makes the manual review and tagging of AR effects a challenging task. It may thus be desirable to automate the generation of AR effect descriptions, as opposed to, for example, requesting human labelers to perform this task.

It may be possible to generate a keyword or tag automatically by processing an augmented image using object recognition. For example, a machine learning model may be trained to detect objects in an image and output a predicted tag or category based on the detected objects. However, such techniques may fail to produce the desired output. For example, an object recognition machine learning model may correctly detect certain objects in an image that has been augmented by an AR effect, but may be unable to distinguish between objects that are specifically associated with the AR effect and objects that formed part of the original image, or base image. For example, where the AR effect is a "dog face filter" that is added to a human face, the machine learning model may struggle to separate the dog features from other features (that are unrelated to the AR effect) in an image or video. As a result, automated descriptions of AR effects produced in this manner may have limited usefulness or relevance.

Examples described herein may address or alleviate the technical problems mentioned above through the use of techniques involving a visual-semantic machine learning model. In some examples, a visual-semantic machine learning model is utilized to provide more accurate, relevant, or comprehensive descriptions of AR effects supported by an interaction system. The techniques described herein may allow for the automatic generation of an AR effect description that separates a rendered AR effect from "base" or "background" content, thus making the description more useful in downstream tasks, such as AR effect indexing, searching, ranking, or classification. In some examples, the AR effect description can be used as a caption, or to provide tags, for that AR effect within an interaction system.

A visual-semantic machine learning model may thus be trained to mimic a human labeler. In some examples, fine-tuning is used to obtain a visual-semantic machine learning model that can better separate or distinguish a target AR effect from "base" or "background" content. In some examples, through fine-tuning, the visual-semantic machine learning model can automatically provide AR effect descriptions based only on an input image. Parameter-efficient fine-tuning techniques, such as Low-Rank Adaptation (LoRA) or prefix tuning, may be utilized for this purpose.

The term "fine-tuning," as used herein, generally refers to a process of adapting a pre-trained machine learning model. For example, a machine learning model may be adapted to improve its performance on a specific task or to make it more suitable for a specific operation. Fine-tuning techniques may include one or more of updating or changing a pre-trained model's internal parameters through additional training, injecting new trainable weights or layers into the model architecture and training on those weights or layers, modifying a model topology by altering layers or connections, changing aspects of the training process (such as loss functions or optimization methods), or any other adaptations that may, for example, result in better model performance on a particular task compared to the pre-trained model.

A method may include generating a second input image by applying a target AR effect to a first input image. The first input image and a second input image may be accessed and provided to a first visual-semantic machine learning model to obtain output describing at least one feature of the target AR effect. In some examples, the first visual-semantic machine learning model is fine-tuned from a second visual-semantic machine learning model on training data comprising a plurality of training samples.

Each training sample may include a first training image, a second training image, and a training description of a given AR effect. The second training image is generated by applying the given AR effect to the first training image.

Based on the output of the first visual-semantic machine learning model, a description of the target AR effect is selected or generated. The description of the target AR effect is stored in association with an identifier of the target AR effect.

Fine-tuning may be used to optimize a general visual-semantic machine learning model that was pre-trained to generate captions of images to focus on AR effects present in images. In some examples, a parameter-efficient fine-tuning, such as LoRA, may be utilized. Parameter-efficient fine-tuning techniques are used to reduce the computational cost of fine-tuning.

In LoRA, weight matrices of the model may be decomposed into low-rank matrices. This reduces the number of parameters that need to be trained. A LoRA process may include using the training samples to update a transformer of the second visual-semantic machine learning model to obtain the first visual-semantic machine learning model.

In some examples, the transformer is between an image encoder and a large language model (LLM) of the first visual-semantic machine learning model. Such a transformer may be referred to as a Querying Transformer (or a "Q-Former"). The updating of the Querying Transformer may include adjusting parameters (e.g., attention weights) of the Querying Transformer while keeping the image encoder and the LLM fixed.

The first visual-semantic machine learning model may generate output that describes at least one visual feature of the target AR effect. For example, the first visual-semantic machine learning model is fine-tuned to describe visual features based on a visual transition from the first input image to the second input image, as caused by the target AR effect. In some examples, the first visual-semantic machine learning model uses the first input image and the second input image to perform a captioning operation. Given that the captioning operation focuses on the AR effect, it may be regarded as being AR effect-specific.

In some examples, the first input image and the second input image are provided to the first visual-semantic machine learning model as a concatenated image. The concatenated image may be generated by concatenating the first input image and the second input image. The concatenating of the first input image and the second input image may include positioning the first input image and the second input image relative to each other in a predetermined spatial arrangement (e.g., a horizontal concatenation) to obtain the concatenated image.

In some examples, two image frames are concatenated to provide or simulate a "before-and-after" that allows a visual-semantic machine learning model to better analyze the effect of an augmentation. In some examples, more than two image frames may be used (e.g., to illustrate the result of an AR effect by presenting a series of frames).

The term "concatenated" is used herein in the context of images to refer to any image formed by combining or integrating multiple (e.g., two or more) images or parts of multiple images. In some examples, the method includes generating the concatenated image by concatenating the first image and the second image.

The first training image and the second training image may be provided to the second visual-semantic machine learning model, during a fine-tuning process, as a concatenated training image. Similarly, in some examples, the concatenated training image may be generated by positioning the first training image and the second training image relative to each other in the predetermined spatial arrangement. The "before-and-after" effect may thus also be simulated during fine-tuning to fine-tune the visual-semantic machine learning model to focus on the effect of an augmentation.

In some examples, the images are video frames. For example, the first input image is a frame of a base video and the second input image is a frame of an augmented video, with the augmented video having been generated by rendering the target AR effect on the base video. Similarly, the first training image may be a frame of a base video and the second training image may be a frame of an augmented video, with the augmented video having been generated by rendering the given AR effect relating to the training sample on the base video.

To obtain an image pair (e.g., a first image and a second image), either for training or inference, a frame of an augmented video that temporally corresponds to a frame of a base video can be identified. The frames may then be extracted to obtain the relevant first and second images.

In some examples, the frame of the base video and the frame of the augmented video do not correspond exactly in time. For example, the two videos may have unequal frame durations. The term "temporally corresponding" should thus be interpreted to include relatively small or minor differences. In some examples, where frames of the two videos have unequal durations, frame duration of one of the videos (which has the longer duration) may be truncated to correspond with the frame duration of the other video (which has the shorter duration).

As mentioned, in some examples, the description of the target AR effect is stored in association with an identifier of the target AR effect. The description may be a natural language text description. In some examples, the output of the first visual-semantic machine learning model is used directly as the description. In other examples, the output is modified to obtain the description, as described further below.

The target AR effect may be indexed in an interaction system based on the description. A method may include receiving, from a user device of a user of the interaction system, a search query. The search query may be matched with a target AR effect (e.g., based on the search query matching the description of the target AR effect as indexed in the interaction system). Responsive to the matching of the target AR effect with the search query and/or user selection of the target AR effect, the interaction system may cause presentation of image data, which has the target AR effect applied thereto, at the user device.

The method may include determining a category of the target AR effect based on the description generated for the AR effect. The category may be stored in association with the identifier of the target AR effect.

The visual-semantic machine learning model may be used to generate descriptions of a plurality of different AR effects. Each description may be stored in a database that matches each AR effect to a respective description.

Examples described herein allow for natural language-based descriptions (e.g., searchable captions or tags) of AR effects to be generated automatically, and at scale, by image captioning/describing functionality of a machine learning model. For example, these descriptions can be used to index a large number (e.g., thousands) of AR effects automatically within an interaction system. By improving the quality of descriptions (e.g., by providing descriptions that focus specifically on the visual effects of augmentations based on a "before-and-after" analysis) the relevance or accuracy of search results can be improved.

Examples described herein may provide numerous technical advantages, such as facilitating retrieval of AR effects from a storage location, improving the quality of search results in an interaction application, allowing for easier generation of insights with respect to similarities or differences between AR effects, as well as improved rating, ranking, recommendation, or categorization of AR effects augmentations.

Examples described herein further utilize model fine-tuning to obtain a visual-semantic machine learning model that has an improved ability to identify or focus on AR effects in images. While manual captioning of AR effects may require extensive human effort and results in inconsistent quality across different human labelers, directly applying a visual-semantic model (e.g., a fine-tuned model) can result in better and more consistent captioning.

Furthermore, the use of parameter-efficient fine-tuning may result in efficient usage of computing resources. For example, a LoRA allows for efficient model specialization while only fine-tuning on a small subset of the original model weights, thereby avoiding interference with the general knowledge in the pre-trained model while reducing computing resource requirements.

In some examples, techniques described herein may improve the functioning of content moderation systems by providing more accurate, detailed, or comprehensive descriptions of an AR effect, in an automated manner. For example, the ability of a computer system to accurately identify that an AR effect (e.g., a new AR effect proposed for use in an interaction system) includes prohibited or objectionable content can be improved by applying the automated AR effect description generation methodologies described herein.

When the effects in this disclosure are considered in aggregate, one or more of the methodologies described herein may obviate a need for certain efforts or resources that otherwise would be involved in the generation or indexing of AR effect descriptions or the retrieval of relevant AR effects. Computing resources used by one or more machines, databases, or networks may be more efficiently utilized or even reduced, such as by providing more accurate or comprehensive AR effect search results or recommendations, thus reducing the need to repeat or further filter user searches. Examples of such computing resources may include processor cycles, network traffic, memory usage, graphics processing unit (GPU) resources, data storage capacity, power consumption, and cooling capacity.

Networked Computing Environment

FIG. 1 is a block diagram showing an example interaction system 100 for facilitating interactions (e.g., exchanging text messages, conducting text, audio and video calls, or playing games) over a network. The interaction system 100 includes multiple user systems 102, each of which hosts multiple applications, including an interaction client 104 (as an example of an interaction application) and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112. An interaction client 104 can also communicate with locally hosted applications 106 using Application Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to deploy particular technology and functionality within the interaction server system 110 initially, but later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, content augmentation (e.g., filters or overlays), message content persistence conditions, entity relationship information, and live event information. Data exchanges within the interaction system 100 are invoked and controlled through functions available via user interfaces of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106, and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the retrieval or application of AR effects; the addition and deletion of entities (e.g., friends) to an entity relationship graph (e.g., the entity graph 308); the location of friends within an entity relationship graph; and opening an application event (e.g., relating to the interaction client 104). The interaction servers 124 host multiple systems and subsystems, described below with reference to FIG. 2.

Linked Applications

Returning to the interaction client 104, features and functions of an external resource (e.g., a linked application 106 or applet) may be made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of a microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as representational state transfer (REST) or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture. Example subsystems are shown in FIG. 2 and are discussed below.

An image processing system 202 provides various functions that enable a user to capture and augment (e.g., annotate, or otherwise modify or edit) media content associated with a message. A camera system 204 includes control software (e.g., in a camera application) that interacts with and controls hardware camera hardware (e.g., directly or via operating system controls) of the user system 102 to modify and augment real-time images captured and displayed via the interaction client 104.

An augmentation system 206 provides functions related to the generation and publishing of augmentations (e.g., filters or media overlays), also referred to AR effects, for images or videos captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation or AR effect may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays (or links/paths thereto) may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geo-location.

The augmentation creation system 214 supports AR developer platforms and includes an application for content creators (e.g., artists and developers) to create and publish augmentations (e.g., AR experiences) of the interaction client 104. The augmentation creation system 214 provides a library of built-in features and tools to content creators including, for example custom shaders, tracking technology, and templates. In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and inter-action within the interaction system 100 and includes a messaging system 210, an audio communication system 216, and a video communication system 212. In some cases, the messaging system 210 is responsible for enforcing the temporary or time-limited access to content by the interac-tion clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

Figure 3:
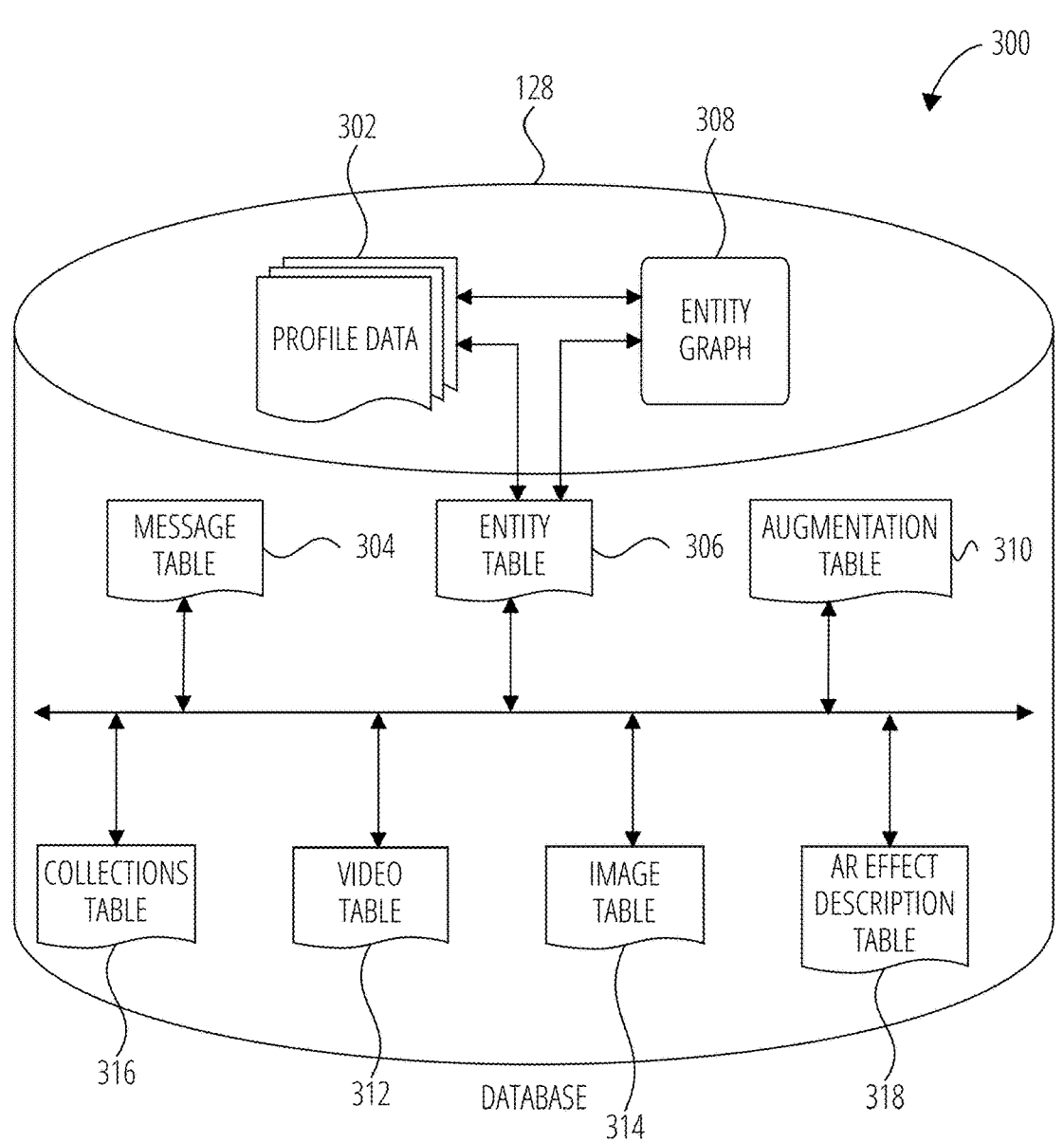
FIG. 3 is a diagrammatic representation of a data structure as maintained in a database, according to some examples.

A user management system 218 is operationally respon-sible for the management of user data and profiles, and maintains entity information (e.g., stored in entity tables 306, entity graphs 308, and profile data 302 shown in FIG. 3) regarding users and relationships between users of the interaction system 100.

A collection management system 220 is operationally responsible for managing sets or collections of media (e.g., collections of text, image video, and audio data). A collec-tion of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a par-ticular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages includ-ing photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share their location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The inter-action client 104 provides a game interface providing a list of available games that can be launched by a user within the context of the interaction client 104 and played with other users of the interaction system 100. The interaction system 100 further enables a particular user to invite other users to participate in the play of a specific game by issuing invita-tions to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interac-tion servers 124. The SDK includes APIs with functions that can be called or invoked by the web-based application. The interaction servers 124 host a JavaScript library that pro-vides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client

104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 or the augmentation system 206 to enhance, filter, or manipulate (e.g., apply an AR effect to) images. The artificial intelligence and machine learning system 230 may also operate with an AR effect description system 232, as described below, to analyze images and generate descriptions of AR effects applied to or present in those images.

The artificial intelligence and machine learning system 230 may implement a visual-semantic machine learning model, also known as a vision-language model. As used herein, the term "visual-semantic machine learning model" refers to a machine learning model or a combination of machine learning models that has the ability to process both visual (e.g., image or video) and language (e.g., textual) data. A visual-semantic machine learning model combines visual and semantic modalities, providing applications such as image captioning and Visual Question Answering (VQA). Examples of uses of visual-semantic machine learning models are described below:

Image captioning: the visual-semantic machine learning model receives an input image and generates a natural language text description or caption of the image.

VQA: the visual-semantic machine learning model receives an image and a prompt, e.g., a question about the image in natural language text format, and generates a natural language text response to the prompt based on the image.

Text-to-image synthesis: the visual-semantic machine learning model receives a text description of a scene or object, and generates an image that is intended to fit the description.

Semantic image retrieval: the visual-semantic machine learning model receives a text query and retrieves one or more images deemed to match (or be most relevant) to the text query based on semantic understanding.

Image-to-text translation: the visual-semantic machine learning model receives an image containing text (e.g., a road sign or a page from a book), extracts the text, and translates the text into another (natural) language.

Phrase grounding: the visual-semantic machine learning model performs object detection from an input image and a natural language phrase.

Examples of machine learning models that can provide such multimodal capabilities include models based on "BLIP" (Bootstrapping Language-Image Pre-training) strategies, e.g., BLIP and BLIP-2. For example, BLIP-2 is a scalable multimodal pre-training method that enables a LLM to ingest and understand images, allowing for image-to-text generation, VQA, and other functionality. A further example of a machine learning model is a CLIP (Contrastive Language-Image Pre-Training) type model. More detailed information regarding example machine learning models is provided below.

In some examples, the artificial intelligence and machine learning system 230 is used for machine learning model training. Training may involve fine-tuning, such as the fine-tuning of a visual-semantic machine learning model to improve its performance in describing AR effects. For example, the visual-semantic machine learning model may be fine-tuned using a parameter-efficient fine-tuning process to adapt the original "captioning" skill of the visual-semantic machine learning model such that the visual-semantic machine learning model "captions" an AR effect appearing in an image, as opposed to describing the entire image or features unrelated to the AR effect.

The artificial intelligence and machine learning system 230 may also be used by the augmentation system 206 to generate augmented content and AR experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic.

The artificial intelligence and machine learning system 230 may also provide chatbot functionality to message interactions 120 between user systems 102 and between a user system 102 and the interaction server system 110. The artificial intelligence and machine learning system 230 may provide various generative functionalities (e.g., allowing a user to generate text, image, or video content based on prompts). The artificial intelligence and machine learning system 230 may work with the audio communication system 216 to provide speech recognition and natural language processing capabilities, allowing users to interact with the interaction system 100 using voice commands.

It may be desirable to generate a description of an AR effect. The AR effect description system 232 may perform various functions relating to the generation and/or storage of descriptions of AR effects. For example, where the interaction system 100 supports a large number of AR effects (e.g., thousands or even millions of AR effects), the AR effect description system 232 may implement an automated pipeline that renders each of a plurality of AR effects on a suitable content item (e.g., by working with the image processing system 202).

The AR effect description system 232 may operate with the artificial intelligence and machine learning system 230 to produce a description of a target AR effect, and store the description for downstream use in the context of the interaction system 100. In some examples, the description, or parts thereof (e.g., words or phrases) may be tokenized for downstream use, e.g., for input into an embedding model.

Data Architecture

FIG. 3 is a schematic diagram illustrating data structures 300, which may be stored in a database, such as the database 128 of the interaction server system 110, according to certain examples. While the content of the database 128 is shown to comprise multiple tables, it will be appreciated that the data could be stored in other types of data structures (e.g., as an object-oriented database).

The database 128 includes message data stored within a message table 304. This message data includes, for any particular message, at least message sender data, message recipient (or receiver) data, and a payload. Further details regarding information that may be included in a message, and included within the message data stored in the message table 304, are described below with reference to FIG. 16.

An entity table 306 stores entity data, and is linked (e.g., referentially) to an entity graph 308 and profile data 302. Entities for which records are maintained within the entity table 306 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 306. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 128 also stores augmentation data, including AR effects, such as filters, overlays, and the like, in an augmentation table 310. The augmentation data is associated with and applied to videos (for which data is stored in a video table 312) and images (for which data is stored in an image table 314).

Filters, in some examples, include virtual content displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 314 includes AR content items (e.g., corresponding to applying "lenses" or AR experiences). An AR content item may include a real-time special effect that may be added to an image or a video.

A collections table 316 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the interaction client 104 may include an icon that is user-selectable to enable a sending user to add specific content to their personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on their location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 312 stores video data that, in some examples, is associated with messages for which records are maintained within the message table 304. Similarly, the image table 314 stores image data associated with messages for which message data is stored in the entity table 306. The entity table 306 may associate various augmentations from the augmentation table 310 with various images and videos stored in the image table 314 and the video table 312.

An AR effect description table 318 stores descriptions for various AR effects supported by the interaction system 100. For example, each AR effect may have a unique identifier, such as a code or name, with a natural language text description of the AR effect being stored in association with the identifier in the AR effect description table 318. The description may facilitate searching. For example, when a user of a user system 102 searches for a keyword via the interaction client 104, the interaction client 104 may locate matching or relevant AR effects by checking the descriptions in the AR effect description table 318. In some cases, data in the AR effect description table 318 may be indexed to facilitate searching and retrieval.

In some examples, the AR effect description system 232 of the interaction system 100 uses the artificial intelligence and machine learning system 230 to automatically generate a description for an AR effect (e.g., a new AR effect generated by a user of the augmentation creation system 214, and uploaded to the interaction system 100) and causes the description to be stored in the AR effect description table 318 for downstream use. The AR effect description table 318 may also include other AR effect metadata, such as AR effect tags, categories, groups, or rankings. For example, the AR effect description system 232 may use a visual-semantic machine learning model to generate an AR effect description and also to identify a category of an AR effect (e.g., sports, birthday, or dogs), and then store the category in association with the identifier of the AR effect in the AR effect description table 318.

Figure 4:
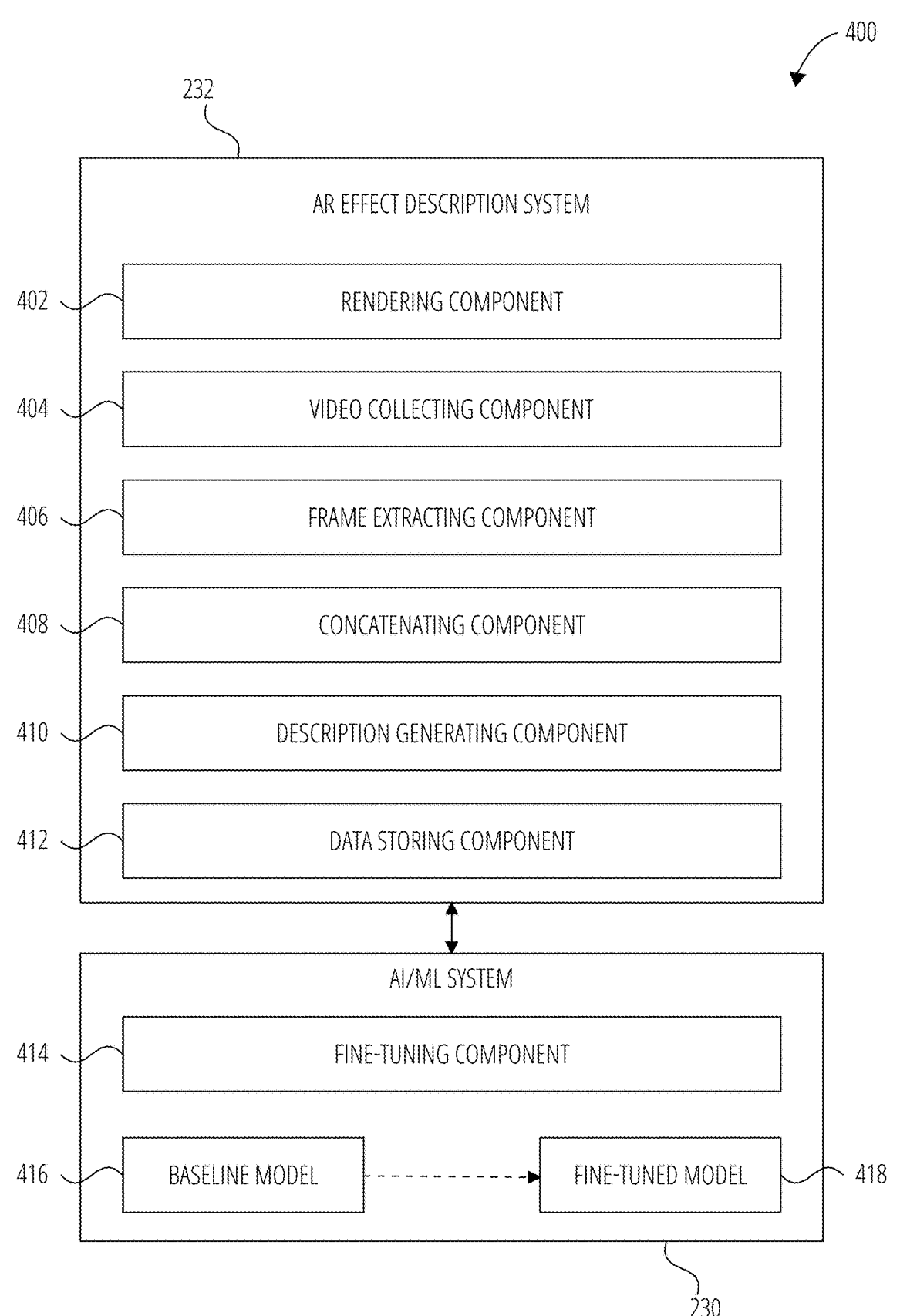
FIG. 4 is a diagrammatic representation of components of an AR effect description system and an artificial intelligence and machine learning system, according to some examples.

FIG. 4 is a diagram 400 illustrating components of the AR effect description system 232 and the artificial intelligence and machine learning system 230 of the interaction system 100 of FIGS. 1 and 2, according to some examples.

The AR effect description system 232 and the artificial intelligence and machine learning system 230 may communicate with each other for one or more purposes, such as utilizing the machine learning functionality of the AR effect description system 232 to generate AR effect descriptions. The AR effect description system 232 and the artificial intelligence and machine learning system 230 may communicate with one or more storage components, such as the database 128 of FIG. 1 or another storage type, for data storage and retrieval.

In some examples, at least some of the components shown in FIG. 4 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

The AR effect description system 232 is shown to include a rendering component 402, a video collecting component 404, a frame extracting component 406, a concatenating component 408, a description generating component 410, and a data storing component 412. The artificial intelligence and machine learning system 230 is shown to include a fine-tuning component 414, a baseline model 416, and a fine-tuned model 418.

The rendering component 402 is responsible for rendering AR effects on content items, such as images or videos. For example, the rendering component 402 may access a first video, or base video, which does not include a certain AR effect, and then apply that AR effect to the base video, thereby yielding a second, or augmented, video. For example, the first video may be a video of a person waving at the camera of the recording device, and the AR effect may be a color filter that changes the color of the hair of the person (e.g., from brown to blue), such that the augmented video shows the person waving at the camera, but with a different hair color than in the base video. The rendering component 402 component may similarly apply an AR effect to a still image to yield an augmented image.

The rendering component 402 may work with the image processing system 202, e.g., to perform object detection and to apply AR effect algorithms to content items. The rendering component 402 may store augmented content items (e.g., the content items, or links/paths thereto, may be stored in the database 128 together with the corresponding base content items, or links/paths thereto). The augmented content items may be used by the artificial intelligence and machine learning system 230 during training (e.g., fine-tuning) and/or for inference, as described further below.

The rendering component 402 may implement or access an automated rendering service (e.g., an automated AR effect rendering service) which may be referred to as a "lens rendering service" or a "filter rendering service." Such a service may provide a pipeline of suitable content, including augmented videos or augmented images. In some examples, the service includes an application configured to render specific AR effects on base videos, which may also be referred to as plate videos. In other words, the rendering service provides an automated service that is capable of supplying video or image content onto which the desired AR effects can be applied. The rendering service may retrieve videos from a library in the database 128 or another storage component. For example, the rendering service may access a base video and separately render (merely for example) 50, 100, or 1500 AR effects onto the base video to obtain 50, 100, or 1500 augmented videos for downstream use.

The video collecting component 404 may be configured to retrieve or collect pairs of videos (e.g., from the database 128). A pair of videos may include a base video and its corresponding augmented video, as described above.

The frame extracting component 406 is responsible for extracting corresponding frames from a base video and its associated augmented video. The frame extracting component 406 may be configured to extract individual frames from a digital video file or stream.

For example, and as mentioned above, the base video may depict a person waving at the camera, with its associated augmented video depicting the person with a different hair color resulting from an AR effect. The frame extracting component 406 may preprocess the videos by extracting corresponding frames from the base video and the augmented video, to allow for a useful comparison of the visual features therein.

Corresponding frames may be respective frames with the same (or substantially the same) timestamp or a same (or substantially the same) sequence position between the base video and the augmented video. As mentioned, small differences (e.g., due to time drift) may be acceptable.

In this way, apart from the AR effect (which is not present in the base video) and changes caused by the AR effect, objects, environments, and positions in the two extracted frames may be substantially aligned. The frame extracted from the base video is referred to below as the "first image" and the frame extracted from the augmented video is referred to below as the "second image."

These pairs of first and second images may be used by the artificial intelligence and machine learning system 230 both for training and inference/prediction purposes. Where a first image and second image are provided to a machine learning model for inference/prediction, they are respectively referred to as a "first input image" and a "second input image," while if a first image and second image are used to train (e.g., fine-tune) a machine learning model, they are respectively referred to as a "first training image" and a "second training image."

In some examples, frames are selected based on differences between the base video and the augmented video. For example, the frame extracting component 406 may automatically select a pair of frames (e.g., first image and second image) that includes a frame from the base video and a temporally corresponding frame from the augmented video with a high degree of pixel difference between the two frames. In some cases, the pair of frames that provides the highest degree of pixel difference may be selected.

To determine the difference between a pair of frames (e.g., first image and second image), the pixelwise loss between the frames may be computed by the frame extracting component 406. In this way, the frame extracting component 406 may be able to assess multiple pairs and find a frame index that provides contrasting images that are useful in representing the relevant AR effect (or an aspect thereof).

In some examples, the first image and the second image are concatenated or combined before they are processed for AR effect description generation. The concatenating component 408 may access two corresponding images and concatenate them, e.g., based on a predetermined spatial arrangement. For example, the first image and the second image may be joined by way of horizontal concatenation such that they are positioned side-to-side in the concatenated image or joined by way of vertical concatenation such that one image is above the other image.

Designing and/or implementing a system or component that can understand the content of an AR effect (e.g., a media overlay, a filter, or an AR experience) may be a challenging task. As mentioned above, to obtain a useful description for the AR effect, the first image and the second image can be fed to a visual-semantic machine learning model. In response, the visual-semantic machine learning model may provide output (e.g., a natural language text response) that describes one or more features of the AR effect.

The fine-tuning component 414 of the artificial intelligence and machine learning system 230 may be configured to fine-tune a pretrained model (e.g., a pretrained visual-semantic machine learning model, such as a BLIP-2 based model). Such a pretrained model may be referred to as a baseline model, and an example baseline model 416 is shown in FIG. 4. In some examples, the fine-tuning component 414 adapts the baseline model 416 using a fine-tuning technique, such as a parameter-efficient fine-tuning technique, to generate or obtain a fine-tuned model 418.

In some examples, and as described in more detail below, the LoRA fine-tuning approach may be implemented by injecting additional low-rank weight matrices into attention layers of the baseline model 416. The fine-tuning component 414 then updates only those matrices while keeping the original weights of the baseline model 416 fixed. This selective updating may prevent interference with the generalized knowledge in pre-trained baseline model 416 while adapting the baseline model 416 to focus on AR effects.

The fine-tuned model 418 is the adapted model produced by operation of the fine-tuning component 414. In some examples, the fine-tuned model 418 contains the same components as the baseline model 416, but has been specialized via injected weight matrices to focus on describing AR effects. When the fine-tuned model 418 receives an input pair of images showing an AR effect, it may isolate the AR effect and generate a textual description thereof as output. In some examples, a general captioning feature of the baseline model 416 is fine-tuned to "caption" only the AR effect, thereby providing an AR effect-specific caption.

The description generating component 410 of the AR effect description system 232 is responsible for generating, selecting, aggregating, augmenting, or modifying a description of a particular AR effect. In some cases, the description generating component 410 may select output from the baseline model 416 and use or apply such output directly as the description of the relevant AR effect. In other cases, the description generating component 410 may generate a new or modified description based on the output from the baseline model 416. In some examples, the description generating component 410 only uses a subset of outputs generated by the baseline model 416 (e.g., by disregarding outputs identified as irrelevant or potentially irrelevant). In some examples, the description generating component 410 scores multiple outputs (e.g., using a machine learning model such as a CLIP model) and selects a subset of the outputs based on the scores, as described further below.

The data storing component 412 may store data relating to AR effects (e.g., in the AR effect description table 318 of the database 128) as shown in FIG. 3. For example, the data storing component 412 may store outputs or responses received from the fine-tuned model 418 in the database 128. The data storing component 412 may store a description of an AR effect, as selected, confirmed, or generated by the description generating component 410 in association with an identifier of the AR effect. The data storing component 412 may store such data to facilitate subsequent retrieval. For example, the data storing component 412 may store the data in the AR effect description table 318 of FIG. 3 in a format that facilitates retrieval in response to AR effect search queries originating from interaction clients 104 operating within the interaction system 100, as described with reference to FIG. 12 and FIG. 13 below.

FIG. 5 is a flowchart illustrating a method 500 suitable for fine-tuning of a visual-semantic machine learning model, according to some examples. Operations in the method 500 may be performed by the interaction system 100 using components (e.g., parts, modules, systems, or engines) described above with respect to FIGS. 1 to 4. Accordingly, by way of example and not limitation, the method 500 is described with reference to the interaction system 100 and components described with respect to FIGS. 1 to 4.

It is noted that while the operations of FIG. 5 are described with reference to the interaction system 100, it shall be appreciated that at least some of the operations may be deployed on various other hardware configurations or be performed by similar components residing elsewhere. The method 500 of FIG. 5 is further described with reference to FIGS. 6 and 7, which illustrate aspects of visual-semantic machine learning models and model fine-tuning, respectively.

The method 500 commences at opening loop element 502, and proceeds to operation 504, where the AR effect description system 232 generates training images. For example, the rendering component 402 may render an augmented video in the manner described above, with the video collecting component 404 and the frame extracting component 406 being used to identify corresponding pairs of image frames from the augmented video and its base video. As mentioned, the frame extracting component 406 may select a first training image and a corresponding second training image (as opposed to other pairs from the base video and augmented video) based on detected differences or contrast (e.g., a high degree of pixel dissimilarity).

As discussed elsewhere, the concatenating component 408 may concatenate pairs of first and second images to reflect AR effects. In this way, each training sample may simulate a "before-and-after" effect of a particular augmentation supported by the interaction system 100. Examples of concatenation are described in more detail below, with reference to FIGS. 9-11. While the description relating to FIGS. 9-11 relate to input images for inference, similar concatenations may be applied to generate or modify training data.

In some examples, training samples are obtained from real data in the interaction system 100, reducing or obviating the need to generate samples specifically for training purposes.

At operation 506, the AR effect description system 232 obtains a training description for each training sample. In other words, each training sample includes not only the concatenated image, but also a description of the AR effect applied to generate the second image in the concatenated image. The training description may be obtained, for example, through manual labeling. A training description may, for example, be a text description of the relevant AR effect (e.g., "adds a dog nose and dog ears to a face" or "changes the color of a person's hair to blue"). The training images and their corresponding descriptions are then stored as training data at operation 508. For example, the training data (or links/paths thereto) may be stored in the database 128 of FIG. 1. The training data may include data that will be used for training, and separate data to be used for validation, as mentioned below.

As a non-limiting example, a total of 100,000 samples may be used in which the description in each sample was generated by a human labeler. These samples may thus be referred to as labeled data. In some examples, an initial set of samples is filtered to obtain a final set of data. For example, a subset of the initial set of 100,000 samples that contains the word "face" in the description may be selected. This may, for example, provide a final set of 35,000 samples specifically selected to assist in optimizing a visual-semantic machine learning model to describe facial AR effects. The final set of data may be split into a training data set and a validation data set (e.g., according to an "80/20" split).

The method 500 proceeds to operation 510, where a baseline model is selected. For example, the baseline model 416 of FIG. 4 may be used. The baseline model 416 may be a pre-trained visual-semantic machine learning model.

Figure 6:
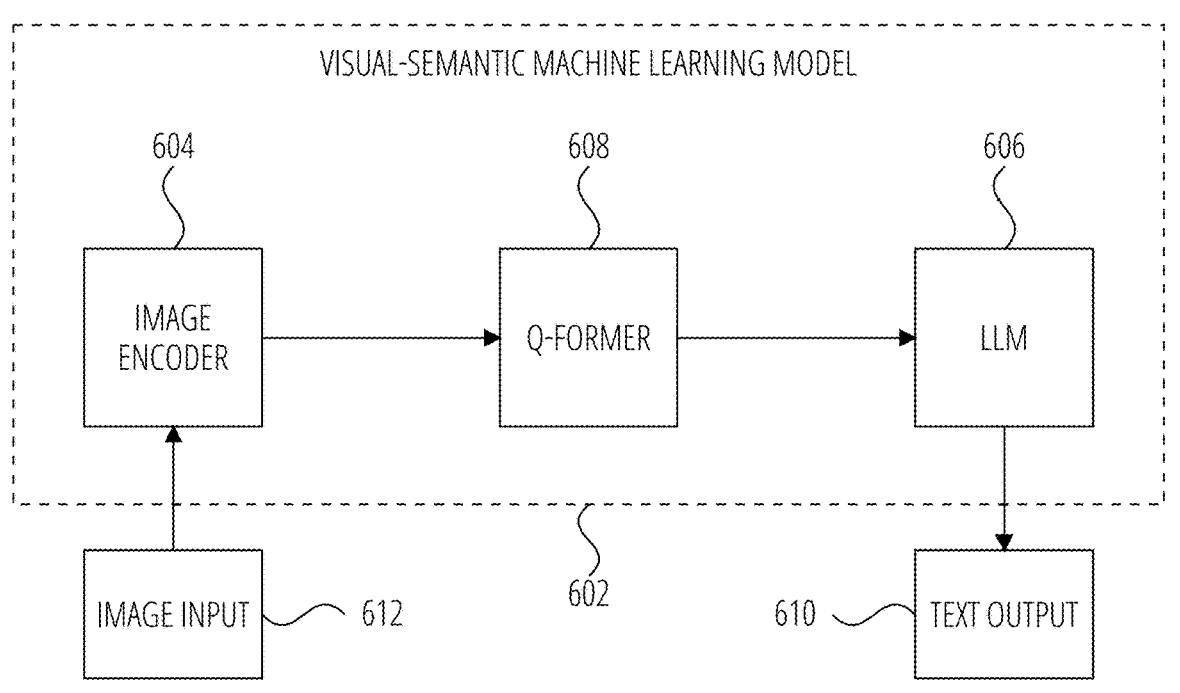
FIG. 6 is a diagrammatic representation of components of a visual-semantic machine learning model, according to some examples.

An example of a visual-semantic machine learning model 602 is illustrated in FIG. 6. As mentioned, BLIP and BLIP-2 are non-limiting examples of visual-semantic machine learning models with multimodal capabilities. The visual-semantic machine learning model 602 is based on the BLIP-2 framework. BLIP-2 is described below to illustrate certain aspects that may be applied to implement a visual-semantic machine learning model. However, it will be appreciated that other types of visual-semantic machine learning models may be used to implement techniques described herein. For example, other multimodal models incorporating LLMs may be used.

BLIP-2 is a scalable multimodal pre-training method that enables a LLM to ingest and understand images. For example, given an input image and a prompt (e.g., a text instruction), a BLIP-2 based model can generate natural language responses according to the prompt. For example, the model may receive an image of the Great Wall of China, together with a prompt to "tell me something about the history of this place." The BLIP-2 based model may respond by providing a text description indicating when and why the Great Wall of China was built. As another example, the model may receive an image of a dog with the prompt: "Describe this animal." The model may respond by stating that the animal is a dog, together with a description of features of the dog. As another example, the BLIP-2 based model may provide an image description or caption based solely on an input image (e.g., without an accompanying prompt).

The visual-semantic machine learning model 602 of FIG. 6 utilizes a frozen visual model in the form of an image encoder 604 and a frozen language model in the form of an LLM 606. In the context of a LLM, the LLM may not have seen any images during its natural language pre-training, hence creating a so-called "vision-language modality gap." It may be challenging to bridge the vision-language modality gap, especially where the LLM remains frozen. BLIP-2 provides a way to bridge the vision-language modality gap, e.g., to allow a LLM to understand visual content, by utilizing a Querying Transformer, also referred to as a Q-Former, that is pre-trained with a two-stage pre-training strategy. The visual-semantic machine learning model 602 includes a Q-Former 608 between the image encoder 604 and the LLM 606.

The Q-Former 608 is thus connected to a visual model (e.g., image encoder 604) and a language model (e.g., LLM 606). In some examples, the Q-Former 608 is the only part of the visual-semantic machine learning model 602 that is trainable as part of the BLIP-2 process (the other parts having been pre-trained and remaining frozen during training of the Q-Former 608). The Q-Former 608 may consist of two subcomponents:

An image transformer that interacts with the (frozen) image encoder 604 for extracting visual features. The Q-Former 608 may extract information from the Q-Former 608 (e.g., a fixed number of output features, regardless of input image resolution) using a collection of trainable query vectors.

A text transformer that can function as both a text encoder and a text decoder.

The Q-Former 608 may be trained on how to extract the most informative visual representation of text. In the BLIP-2 strategy, the following three pre-training objectives may be optimized:

Image-Text Contrastive Learning (ITC). This type of learning is used to learn how to align an image representation and text representation, maximizing the mutual information between them.

Image-grounded Text Generation (ITG). This type of learning is used to teach the Q-Former how to generate text.

Image-Text Matching (ITM). This type of learning is used to teach fine-grained alignment between image and text representation.

The first pre-training stage may be referred to as vision-and-language representation learning. In this stage, the Q-Former 608 is connected to the frozen visual model (e.g., image encoder 604) and pre-trained with image-text pairs. The Q-Former 608 learns to extract image features that are most relevant to the corresponding text.

The second pre-training stage may be referred to as vision-to-language generative learning. In this stage, the output of the Q-Former 608 is connected to the frozen language model (e.g., LLM 606). The Q-Former 608 is trained such that its output features can be interpreted by the LLM to generate the corresponding text. LLMs used in BLIP-2 models may include decoder-based LLMs or encoder-based LLMs.

Generally, after pre-training, a Q-Former, such as the Q-Former 608, can effectively act as a bridge between visual and language models, thus closing the vision-language modality gap. During inference, visual-semantic machine learning model 602 may receive an image and a prompt, e.g., a text instruction. The visual-semantic machine learning model 602 may append the text instruction after the output of the Q-Former 608 as input to the LLM. The visual-semantic machine learning model 602 may also receive only an image. In some examples, where the image is not accompanied by a prompt, the visual-semantic machine learning model 602 will generate a caption based on the image content as represented in the output of the Q-Former 608.

The output of the Q-Former 608 may be projected linearly to match the size of a text embedding of the LLM 606. This may allow the LLM 606 to embed the visual information extracted from the Q-Former 608.

Accordingly, a visual model (e.g., the image encoder 604) may extract features from an image, with an intermediate component (e.g., the Q-Former 608) selecting information that is relevant while filtering out information irrelevant to the LLM (e.g., text output 610). A visual-semantic machine learning model, such as the visual-semantic machine learning model 602 of FIG. 6, may be used for various purposes, such as VQA, image-text retrieval, or image captioning. As shown in FIG. 6, in the case of image captioning, as mentioned above, the visual-semantic machine learning model 602 can generate a text output 610 based on an image input 612 to describe the visual features of the image input 612.

Referring back to FIG. 5, at operation 512, the baseline model 416 (e.g., the visual-semantic machine learning model 602 of FIG. 6) is fine-tuned on the relevant training data using a parameter-efficient fine-tuning process. A parameter-efficient fine-tuning process may be used to fine-tune the baseline model 416 to substantially "ignore" content in input images that does not relate to an AR effect, and thus generate a description or caption specific to the AR effect.

During the fine-tuning process, the baseline model 416 may be trained on training samples as described above (e.g., concatenated images each showing a "before-and-after" effect of an augmentation, together with a training description or label). This improves the captioning ability of the baseline model 416 as it relates to describing AR effects. Moreover, a parameter-efficient fine-tuning process provides a lightweight mechanism that may make the fine-tuning process relatively quick and resource-light. An example of such a process is LoRA, in which attention weights of a machine learning model are updated while other weights are kept frozen. LoRA is described below with reference to FIG. 7.

Once fine-tuning has been completed, the fine-tuned model 418 (e.g., the adapted version of the visual-semantic machine learning model 602) may be evaluated. For example, performance of the fine-tuned model 418 may be compared against performance of the baseline model 416 or against descriptions provided by human labelers. If the fine-tuned model 418 is appropriately fine-tuned, it may perform better than the baseline model 416 in focusing on AR effects and may also provide faster and more consistent outputs than human labelers.

In some examples, fine-tuning is performed only with respect to the Q-Former 608, while keeping the image encoder 604 and the LLM 606 fixed. While the baseline version of the Q-Former 608 may provide output (e.g., embeddings) to the LLM 606 that focus both on AR effects and other image content (such as other human features or backgrounds), the fine-tuned version of the Q-Former 608 may, as a result of the fine-tuning process, provide output to the LLM 606 that focuses more specifically on the AR effects. This allows the LLM 606 to generate text output that specifically describes the AR effect that is present in the relevant input image (which may, in some examples, illustrate the visual transition caused by the AR effect to further facilitate analysis thereof by the visual-semantic machine learning model 602). The descriptions of FIG. 14 and FIG. 15 below provide more information on machine learning processes, including, for example, model evaluation.

The fine-tuned model 418 (e.g., the adapted version of the visual-semantic machine learning model 602) is deployed (operation 514) to generate AR effect descriptions for target AR effects. The method 500 of FIG. 5 concludes at closing loop element 516.

Figure 7:
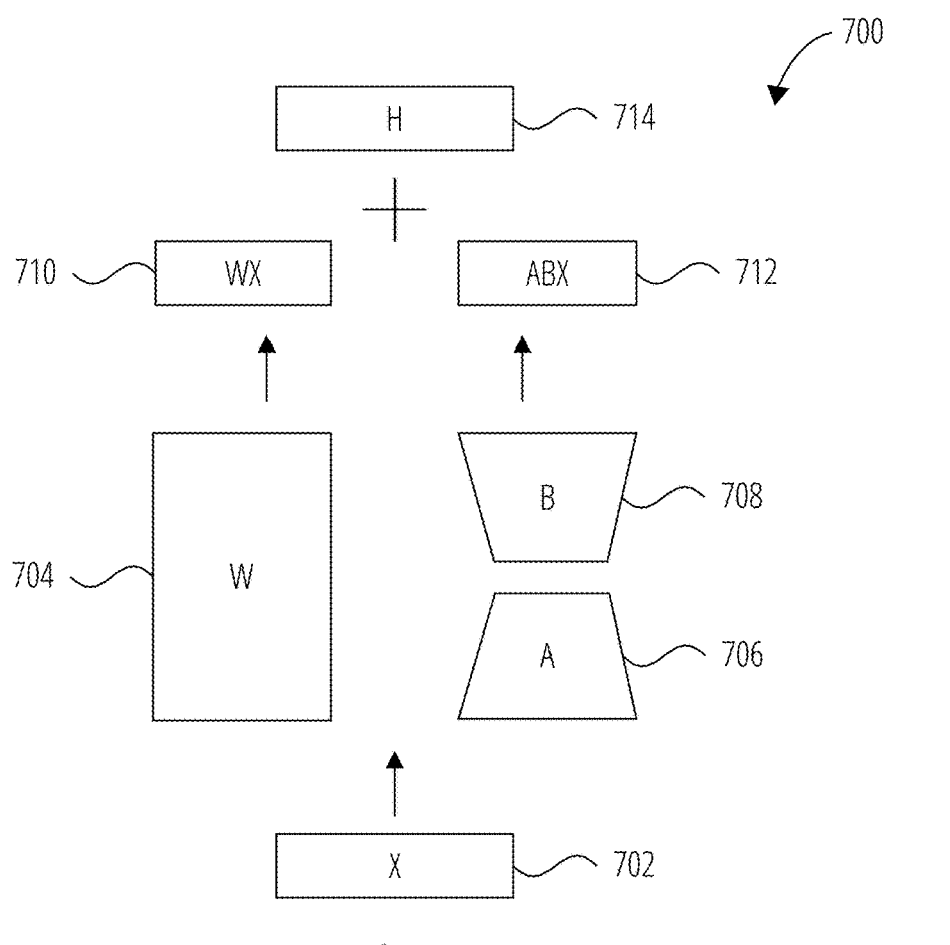
FIG. 7 diagrammatically illustrates a parameter-efficient fine-tuning technique, according to some examples.

Referring now to FIG. 7, a LoRA process 700 is illustrated as a non-limiting example of a parameter-efficient fine-tuning technique. In some cases, fine-tuning of large models is expensive and time-consuming. The LoRA process 700 involves freezing pre-trained model weights and injecting trainable layers in the form of rank-decomposition matrices. In the case of a transformer architecture, these layers may be injected in some or all transformer blocks. This reduces the number of trainable parameters, and thus the GPU memory requirements for the fine-tuning task.

When using the LoRA process 700, the original weights of a model are frozen during the fine-tuning process. Instead, modifications are applied to a separate set of weights and their new values are added to the original parameters.

Turning now specifically to FIG. 7, pre-trained weights (e.g., self-attention weights of a transformer) can be adapted using the LoRA process 700. FIG. 7 illustrates input 702 to a layer as X, and an original pretrained (frozen) weight matrix 704 as W which is defined as follows:

$$W \in \mathbb{R}^{d \times k}$$

Initially, prior to fine-tuning, in order to obtain final output 714 for the layer (marked as H), the model performs H=WX as its forward pass. The update or adaptation matrix to learn can be regarded as ΔW. ΔW is constrained by representing it with a low rank decomposition:

$$W + \Delta W = W + BA,$$

$$\text{where } B \in \mathbb{R}^{d \times r}, A \in \mathbb{R}^{r \times k},$$

$$\text{and where the rank } r \ll \min(d, k).$$

In FIGS. 7, A and B are shown as low-rank matrix 706 and a low-rank matrix 708, respectively. Both W (weight matrix 704) and ΔW (low-rank matrix 706 and low-rank matrix 708) are multiplied by the same input 702. The output vectors are summed coordinate-wise. The new forward pass becomes:

$$H = WX + \Delta WX = WX + BAX$$

In FIG. 7, WX is shown as output 710 and BAX is shown as output 712. The final trained forward pass can be expressed as follows (merges the pretrained W with the low-rank update BA to obtain the final output 714):

$$H = (W + BA)X$$

To illustrate the parameter-efficiency, one can assume an original 100×100 matrix. This matrix represents the weight of a pretrained layer (e.g., part of the attention weights of a model). The LoRA process 700 can be used to approximate the original matrix with two low-rank matrices, such as the low-rank matrix 706 and the low-rank matrix 708 depicted in FIG. 7. For example, the low-rank matrix 708 can have a size of 100×5 and the low-rank matrix 706 can have a size of 5×100. While the number of parameters in the original matrix is 10,000, the number of parameters in low-rank matrix 706 and low-rank matrix 708 combined is 1,000. This makes it possible to fine-tune the layer with only 1,000 parameters, instead of the original 10,000 parameters, making the fine-tuning process faster and more efficient.

In some examples, during training, W is frozen and does not receive gradient updates, while A and B contain trainable parameters and are updated. In some examples, a random Gaussian initialization can be used for A, and B can be zero, making ΔW zero when the LoRA process 700 starts. When deployed in production, the overall weight matrix W+BA can be computed and stored, and inference can be performed as usual. In some examples, a merging ratio α may be applied to replace BA with αBA.

By using a parameter-efficient fine-tuning technique, such as LoRA, a visual-semantic machine learning model, such as the visual-semantic machine learning model 602, can be efficiently fine-tuned to change its captioning ability to describe AR effects instead of full image contents. In some examples, ΔW captures the modifications needed for the desired task with significantly fewer parameters.

This approach may obviate the need (and computing resources required) to add custom prompts to input images in an attempt to obtain more focused AR effect descriptions (as opposed to general descriptions) from the visual-semantic machine learning model. A fine-tuned model, such as the fine-tuned model 418 of FIG. 4, can be applied across a large number of AR effects to capture accurate descriptions in a consistent and/or uniform manner.

By freezing a majority of pre-trained weights and only updating certain layers, such as attention layers, the fine-tuning process may be efficient in terms of computational resources and time. For example, trainable matrices A and B of FIG. 7 can be inserted into multi-head self-attention layers of the baseline model 416, which contains transformer blocks, while keeping other parameters frozen.

FIG. 8 is a flowchart illustrating a method 800 suitable for generating a description of an AR effect, according to some examples. Operations in the method 800 may be performed by the interaction system 100 using components (e.g., parts, modules, systems, or engines) described above with respect to FIGS. 1 to 4. Accordingly, by way of example and not limitation, the method 800 is described with reference to the interaction system 100 and components described with respect to FIGS. 1 to 4.

It is noted that while the operations of FIG. 8 are described with reference to the interaction system 100, it shall be appreciated that at least some of the operations may be deployed on various other hardware configurations or be performed by similar components residing elsewhere. The method 800 is further described with reference to example images shown in FIGS. 9 to 11.

The method 800 commences at opening loop element 802, and proceeds to operation 804, where an AR effect is applied to a base video to obtain an augmented video. In FIG. 8 (viewed together with FIG. 10 and FIG. 11) a "dog face" filter is used as a non-limiting example of an AR effect. For example, the base video may be a video depicting a person, including the face of the person, but without any AR effect applied thereto. The rendering component 402 of the AR effect description system 232 (see FIG. 4) then applies the AR effect to add dog features to the face of the person (see FIG. 10, which is discussed below).

The video collecting component 404 retrieves the base video and the augmented video, and the frame extracting component 406 extracts a pair of corresponding frames (e.g., temporally corresponding frames, as discussed above) at operation 806. As a result, a first input image and a second input image are obtained by the frame extracting component 406. As mentioned, the frame extracting component 406 may select the first input image and a second input image (as opposed to other pairs from the base video and augmented video) based on detected differences or contrast (e.g., a high degree of pixel dissimilarity).

For example, the first input image is from the base video and shows the "normal" (e.g., not augmented) face of the person, while the second input image is from the augmented video and shows the same content as the first input image, except for the dog features that have been overlaid onto the face of the person by the rendering component 402. The rendering component 402 may operate with the image processing system 202 to process the base video such that the augmented video includes the "dog face" filter.

FIG. 9 shows an example of a first image 900, and FIG. 10 shows an example of a second image 1000 which includes the AR effect 1002 in the example form of the "dog face" filter. The first image 900 and the second image 1000 may be used as part of training data (e.g., together with a training description) or during inference, as in the method 800 of FIG. 8.

The first image 900 and the second image 1000 are thus used as examples of a first input image and a second input image to describe certain aspects of the method 800 below. However, it will be appreciated that numerous other types of AR effects or images may be used in other examples of the techniques described herein.

The method 800 proceeds to operation 808, where the concatenating component 408 generates a concatenated image that comprises the first image 900 and the second image 1000. FIG. 11 shows an example of a concatenated image 1100 in which the first image 900 and the second image 1000 are joined in a horizontal concatenation.

Specifically, in FIG. 11, the first image 900 is located on a left side of the concatenated image 1100 and the second image 1000 is located on a right side of the concatenated image 1100 to provide a left-to-right transformation 1102, as will be further described below. The concatenated image 1100 is a non-limiting example used to describe certain aspects of the method 800 and it will be appreciated that other types of concatenation (e.g., vertical concatenation) may be used in other examples of the techniques described herein. Furthermore, in some examples, a concatenated image may include more than two images, such as a series of three frames from a base video and a corresponding (e.g., temporally corresponding) series of three frames from an augmented video.

Referring now to operation 810 of FIG. 8, the concatenated image 1100 is then provided to a visual-semantic machine learning model, such as the fine-tuned model 418 (which may be a fine-tuned version of the visual-semantic machine learning model 602 of FIG. 6). The concatenated image 1100 shows the AR effect 1002, which may be referred to as the "target AR effect" in this context.

As described above, the visual-semantic machine learning model is trained, and in some examples fine-tuned, to describe a visual effect of the AR effect 1002 in question. For example, the fine-tuned model 418 may be adapted to analyze the left-to-right transformation 1102 (based on it being fine-tuned on similarly arranged "before-and-after" images with corresponding captions) and generate a caption that specifically describes the AR effect 1002 (in other words, to perform an AR effect-specific captioning operation).

Accordingly, in some examples, only the concatenated image 1100 is provided to the visual-semantic machine learning model (e.g., without any captioning instruction or captioning prompt) and no explicit instruction (e.g., a text prompt) is needed.

After providing the concatenated image 1100 to the visual-semantic machine learning model (e.g., the fine-tuned model 418 of the artificial intelligence and machine learning system 230), the description generating component 410 of the AR effect description system 232 receives output from the visual-semantic machine learning model at operation 812. The output describes at least one feature of the AR effect 1002, such as the visual effect thereof. For example, the output from the visual-semantic machine learning model may read: "Adds a dog nose, dog ears, and dog tongue to a person's face."

The visual-semantic machine learning model thus automatically performs visual feature extraction and presents natural language descriptions of these features for downstream use. For example, downstream use in searching is described in more detail below with reference to FIG. 12 and FIG. 13.

In this way, the pretrained captioning capabilities of a visual-semantic machine learning model can (particularly when fine-tuned) be leveraged to automate and/or improve the generation of AR effect descriptions. In the interaction system 100 of FIG. 1, the output from the baseline model 416 may be stored (e.g., in the AR effect description table 318 of FIG. 3 or in a table storing "raw" or "preliminary" descriptions).

At operation 814 of the method 800 of FIG. 8, the description generating component 410 generates or selects a description of the relevant AR effect. As mentioned, the description generating component 410 may use the output of the visual-semantic machine learning model directly as the description, or it may make changes to the output.

For example, the AR effect description system 232 may obtain multiple outputs that relate to the same AR effect (e.g., a number of different concatenated images may be fed to the fine-tuned model 418, all having the same target AR effect), and the description generating component 410 may aggregate or select from the outputs to obtain a final description. In some examples, the description generating component 410 may utilize a machine learning model of the artificial intelligence and machine learning system 230 to summarize, filter, and/or adjust the output (or outputs) of the fine-tuned model 418, or to generate a set of keywords or tags describing the AR effect, based on the output (or outputs) of the fine-tuned model 418.

In some examples, the description generating component 410 may automatically assess the quality or relevance of a response/output to determine whether to include a response in the final description or whether to consider the response in generating the final description. CLIP is an example of a neural network model that may be used for this purpose. Given an image and a textual description (e.g., an augmented video frame and one of the responses generated by the fine-tuned model 418), a CLIP-based model may determine how closely they match by calculating a similarity score in a shared embedding space. The resultant score may be seen as a measure of relevance between the given image and the text.

Accordingly, the description generating component 410 may generate a relevance or similarity score, such as a CLIP score, for an (or each) output. If the score is high, it may suggest that the output is relevant and should be included in or considered when generating the final description. Conversely, a low score may indicate a poor match or irrelevance. The description generating component 410 may, for example, include or consider all outputs with scores that are above a certain threshold, or include or consider a predetermined number of outputs with the highest scores.

In some examples, the description generating component 410 utilizes an affinity score, which may be calculated as follows:

The relevant response is encoded into an embedding vector using a CLIP model's text encoder.

The relevant image (e.g., augmented frame) is also encoded into an embedding vector using the CLIP model's image encoder.

The cosine similarity between the text and image embeddings is then calculated to obtain a similarity score, e.g., between −1 and 1.

This cosine similarity is the "affinity score" reflecting how well the text matches the image content.

The score is then bounded between 0 and 100 by taking, for example, max (0, 100*cos_sim(text_embedding, image_embedding)).

Once the description has been generated, the data storing component 412 stores (operation 816) the description of the target AR effect in association with the target AR effect (e.g., with an identifier of the target AR effect in the AR effect description table 318). This enables the interaction system 100 to automatically generate and store descriptions indicating what each AR effect "is about." In this way, the description can be used for downstream purposes, e.g., for searching or ranking purposes. In some examples, the descriptions of AR effects are used to index data in the AR effect description table 318 to facilitate searching and retrieval.

For example, a user may use the mobile device 114 of FIG. 1 that executes the interaction client 104 to search for the AR effect 1002 of FIG. 10 (the "dog face" filter). The user may input a search query, such as "dog face," "dog tongue," or the like, with the interaction client 104 then matching the search query with the description of the AR effect 1002 as stored in the AR effect description table 318 (for example: "Adds a dog nose, dog ears, and dog tongue to a person's face")

In response to the matching of the AR effect 1002 with the search query, the interaction client 104 may cause presentation of image data at mobile device 114 and apply the AR effect 1002 to the image data. In some cases, the AR effect 1002 is only presented and applied after receiving user input confirming selection of the AR effect 1002 (e.g., from a number of surfaced "hits").

The AR effect 1002 may be applied to the image data at operation 818. In some cases, the AR effect 1002 is applied in real-time (e.g., applied to an object presented in a camera feed interface of the interaction client 104 presented on the mobile device 114), allowing the user to capture an image or video that includes the AR effect 1002. In other cases, the AR effect 1002 can be applied to previously captured content loaded from memory. The method 800 concludes at closing loop element 820.

It is noted that the left-to-right transformation 1102 of FIG. 11, as provided via horizontal concatenation, is a non-limiting example. For example, a right-to-left transformation may be provided by concatenating images such that the first image (e.g., before image) is located on the right and the second image (e.g., after image) is located on the left. Top-to-bottom or bottom-to-top transformations may be provided via vertical concatenations. In each case, the same predetermined spatial arrangement may be used during training (e.g., fine-tuning of the baseline model 416) and inference (e.g., generated descriptions for new, unseen AR effects), to improve the model's performance.

While the method 500 of FIG. 5 and the method 800 of FIG. 8 refer to a concatenated image, such as the concatenated image 1100, in other examples, images may be fed into a machine learning model separately instead of in a concatenated form. For example, in some cases, a first image and a second image may be provided separately to a visual-semantic machine learning model, after which the visual-semantic machine learning model provides output to describe observed visual effects.

As mentioned above, it may be desirable, in some cases, to utilize more than two images. For example, in the case of a specific AR effect (e.g., an AR experience), different visual effects may be observed at different times, such as different stages of the AR experience. In such cases, multiple pairs of images may be extracted from a base video and augmented video, respectively.

For instance, the frame extracting component 406 of FIG. 4 may extract a first pair of images corresponding to a first point in time in both videos, a second pair of images corresponding to a second point in time in both videos, and a third pair of images corresponding to a third point in time in both videos, with each pair of images illustrating different or varying features of an AR effect. A visual-semantic machine learning model, such as the fine-tuned model 418, may then be trained to describe the visual effects observed at these different stages, thereby allowing for the generation of a comprehensive description of an AR effect.

In some examples, techniques described herein may improve the functioning of content moderation systems by providing more accurate, detailed, or comprehensive descriptions of an AR effect, in an automated manner. Content moderation may be streamlined by, for example, reducing the need to manually review AR effects.

Referring, for example, back to FIG. 2, the augmentation creation system 214 may enable developers or content creators to create and publish new AR effects to the interaction system 100. However, it may be desirable to review such new AR effects for objectionable or harmful content. In some cases, the AR effect description system 232 may automatically determine, based on the description of an AR effect, that the AR effect contains or produces objectionable or harmful content, and flag the AR effect accordingly in the AR effect description table 318. For example, the AR effect description system 232 may detect potentially objectionable or harmful words, contexts, or sentiments in the description of the AR effect, and flag the relevant AR effect. In response to detecting this flag, the interaction system 100 may then not make the AR effect available for use on the interaction client 104, or may automatically impose usage restrictions (e.g., age restrictions).

As described elsewhere, once an AR effect description has been generated, the data storing component 412 may store the description in association with the AR effect. Table 1 below includes examples of such descriptions that may, for example, be generated, selected, and/or aggregated using techniques described herein, and stored in the AR effect description table 318 for use in the interaction system 100. The examples provided are of AR effects that relate to pandas, and are provided merely for illustrative purposes.

TABLE 1

Examples of AR effect descriptions

| AR effect ID | AR effect description |
|---|---|
| 23101 | Adds a panda with leaves to an image of a person |
| 23102 | Adds a background of bamboo forest; converts face into a panda with eyes and mouth |
| 23103 | Puts person's eyes and mouth on panda face; adds trees in the background |
| 23104 | Adds a panda nose to the face of a person; adds a bamboo background |
| 23105 | Adds a panda, flowers, leaves, and text to a person image |
| 23106 | Adds a green frame around the person; adds a baby panda in the corner |
| 23107 | Places a panda house and a flying panda over the image |

Figure 13:
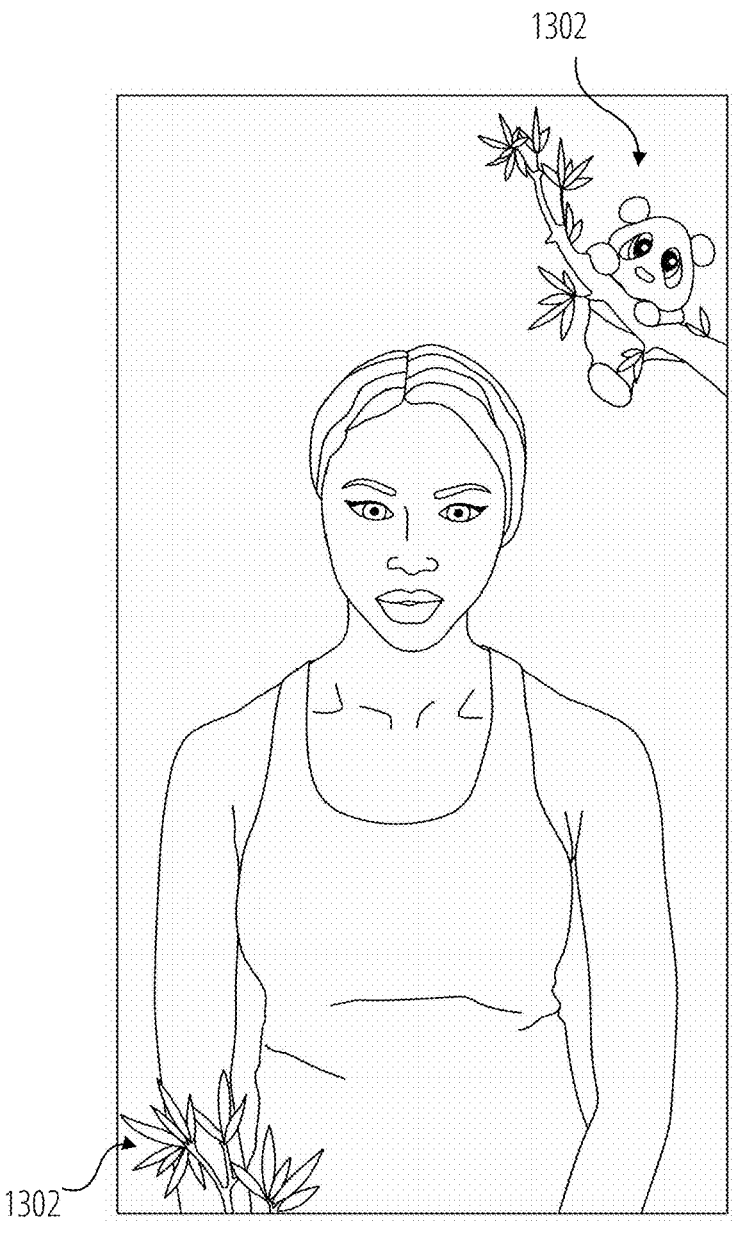
FIG. 13 shows a second image that is generated by applying an AR effect to the first image of FIG. 12, according to some examples.

Referring, for example, to the AR effect identified by AR effect ID 23101 in Table 1, this AR effect is described (by way of the automated techniques described herein) as adding a panda and leaves to an image of a person. FIG. 12 shows a first image 1200, and FIG. 13 shows a second image 1300 that includes the AR effect 1302 identified by ID 23101, according to some examples. The first image 1200 may be from a base video and shows a "normally captured" (e.g., not augmented) person image, while the second image 1300 may be from an augmented video showing the same content as the first image 1200, but for the panda-related AR effect 1302 (e.g., as applied by the rendering component 402 of FIG. 4).

A user may use the mobile device 114 of FIG. 1 that executes the interaction client 104 to search for an AR effect relating to pandas. For example, the user may input the following search query: "panda in a bamboo forest." The interaction client 104 may then match the search query with the most relevant descriptions in the AR effect description table 318, such as one or more of the descriptions in Table 1. The interaction client 104 may identify the AR effect ID relating to each relevant description in order to surface the relevant AR effect.

In some examples, the interaction client 104 may obtain (e.g., from the augmentation system 206) a ranking of relevant AR effects (e.g., a ranking that is based on the degree of matching between the search query and the respective descriptions in the AR effect description table 318). The interaction client 104 may present the relevant AR effects (e.g., some or all of the AR effects in Table 1) to the user via the interaction client 104, based on their relevant rankings, allowing the user to select one of the AR effects to apply in a particular situation.

In response to the matching of the AR effect 1302 with the search query and user selection thereof from a plurality of options, the interaction client 104 may cause presentation of image data at mobile device 114 and apply the AR effect 1302 to the image data, as described above.

Accordingly, techniques described herein provide useful metadata describing a particular AR effect to facilitate applications such as searching for AR effects, generating AR effect recommendations, or ranking AR effects according to relevance. AR effect descriptions generated by a fine-tuned visual-semantic machine learning model may be of higher quality, more consistent, or more uniform than those prepared by other labelers, and may be produced rapidly and at scale.

Machine Learning Examples

Figure 14:
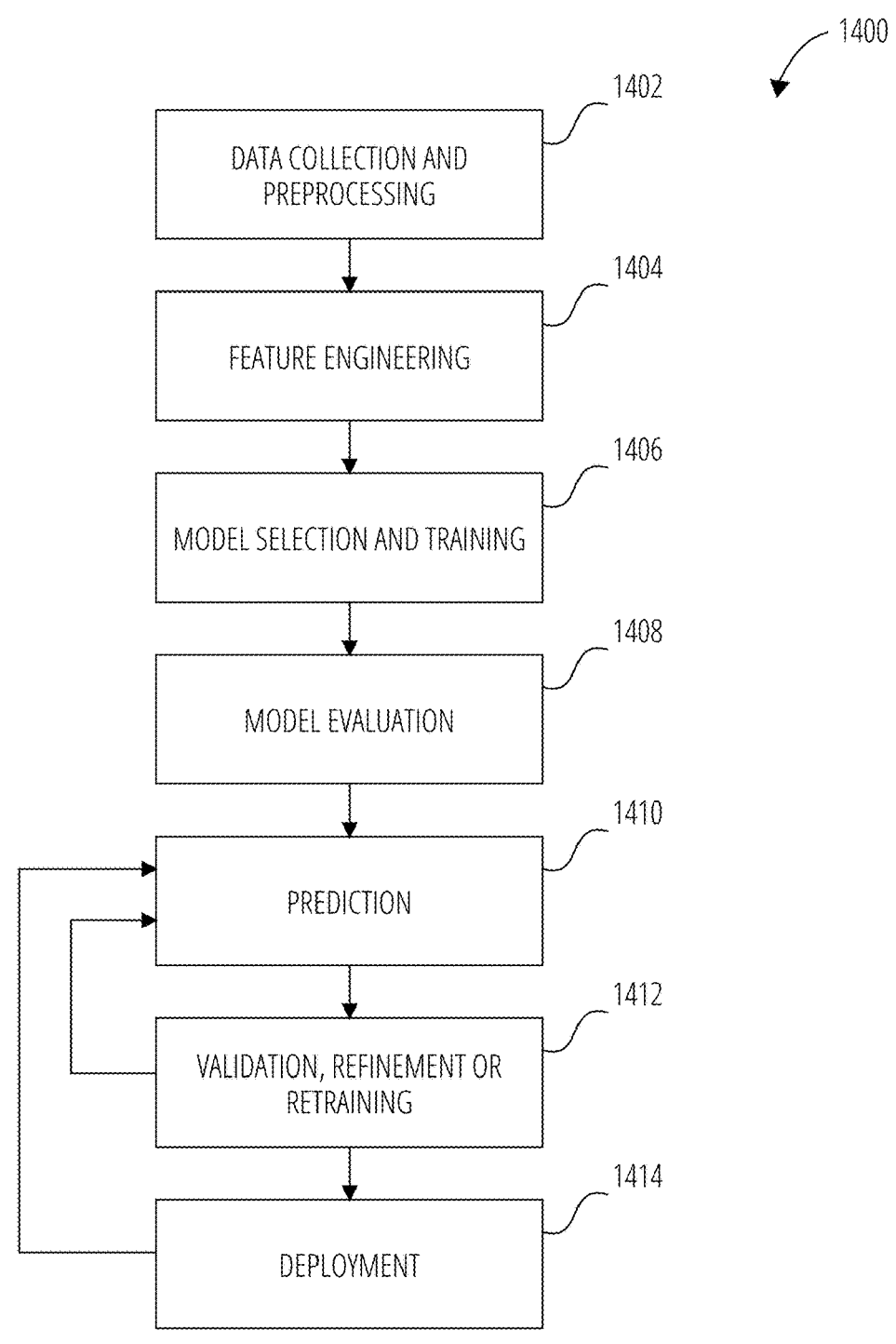
FIG. 14 diagrammatically illustrates a machine learning pipeline, according to some examples.

FIG. 14 is a flowchart depicting a machine learning pipeline 1400, according to some examples. The machine learning pipeline 1400 may be used to generate a trained model, for example, the trained machine learning program 1502 shown in the diagram 1500 of FIG. 15.

Broadly, machine learning may involve using computer algorithms to automatically learn patterns and relationships in data, potentially without the need for explicit programming. Machine learning algorithms may be divided into three main categories: supervised learning, unsupervised learning, and reinforcement learning.

Supervised learning involves training a model using labeled data to predict an output for new, unseen inputs. Examples of supervised learning algorithms may include linear regression, decision trees, and neural networks.

Unsupervised learning involves training a model on unlabeled data to find hidden patterns and relationships in the data. Examples of unsupervised learning algorithms may include clustering, principal component analysis, and generative models, such as autoencoders.

Reinforcement learning involves training a model to make decisions in a dynamic environment by receiving feedback in the form of rewards or penalties. Examples of reinforcement learning algorithms may include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is a supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms may include decision trees, k-nearest neighbors, clustering algorithms, and deep learning algorithms, such as convolutional neural networks (CNN), recurrent neural networks (RNN), and transformer models. The choice of algorithm may depend on the nature of the data, the complexity of the problem, and the performance requirements of the application.

The performance of machine learning models may be evaluated on a separate test set of data that was not used during training to ensure that the model can generalize to new, unseen data.

Although several specific examples of machine learning algorithms are discussed herein, at least some principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Generating a trained machine learning program 1502 may include multiple phases that form part of the machine learning pipeline 1400, including for example the following phases illustrated in FIG. 14:

Data collection and preprocessing 1402: This phase may include acquiring and cleaning data to ensure that it is suitable for use in the machine learning model. This phase may also include removing duplicates, handling missing values, and converting data into a suitable format.

Feature engineering 1404: This phase may include selecting and transforming the training data 1506 to create features that are useful for predicting the target variable. Feature engineering may include (1) receiving features 1508 (e.g., as structured or labeled data in supervised learning) and/or (2) identifying features 1508 (e.g., unstructured or unlabeled data for unsupervised learning) in training data 1506.

Model selection and training 1406: This phase may include selecting an appropriate machine learning algorithm and training it on the preprocessed data. This phase may further involve splitting the data into training and testing sets, using cross-validation to evaluate the model, and tuning hyperparameters to improve performance.

Model evaluation 1408: This phase may include evaluating the performance of a trained model (e.g., the trained machine learning program 1502) on a separate testing dataset. This phase can help determine if the model is overfitting or underfitting and determine whether the model is suitable for deployment.

Prediction 1410: This phase involves using a trained model (e.g., trained machine learning program 1502) to generate predictions on new, unseen data.

Validation, refinement or retraining 1412: This phase may include updating a model based on feedback generated from the prediction phase, such as new data or user feedback.

Deployment 1414: This phase may include integrating the trained model (e.g., the trained machine learning program 1502) into a more extensive system or application, such as a web service, mobile app, or Internet of Things (IoT) device. This phase can involve setting up APIs, building a user interface, and ensuring that the model is scalable and can handle large volumes of data.

Figure 15:
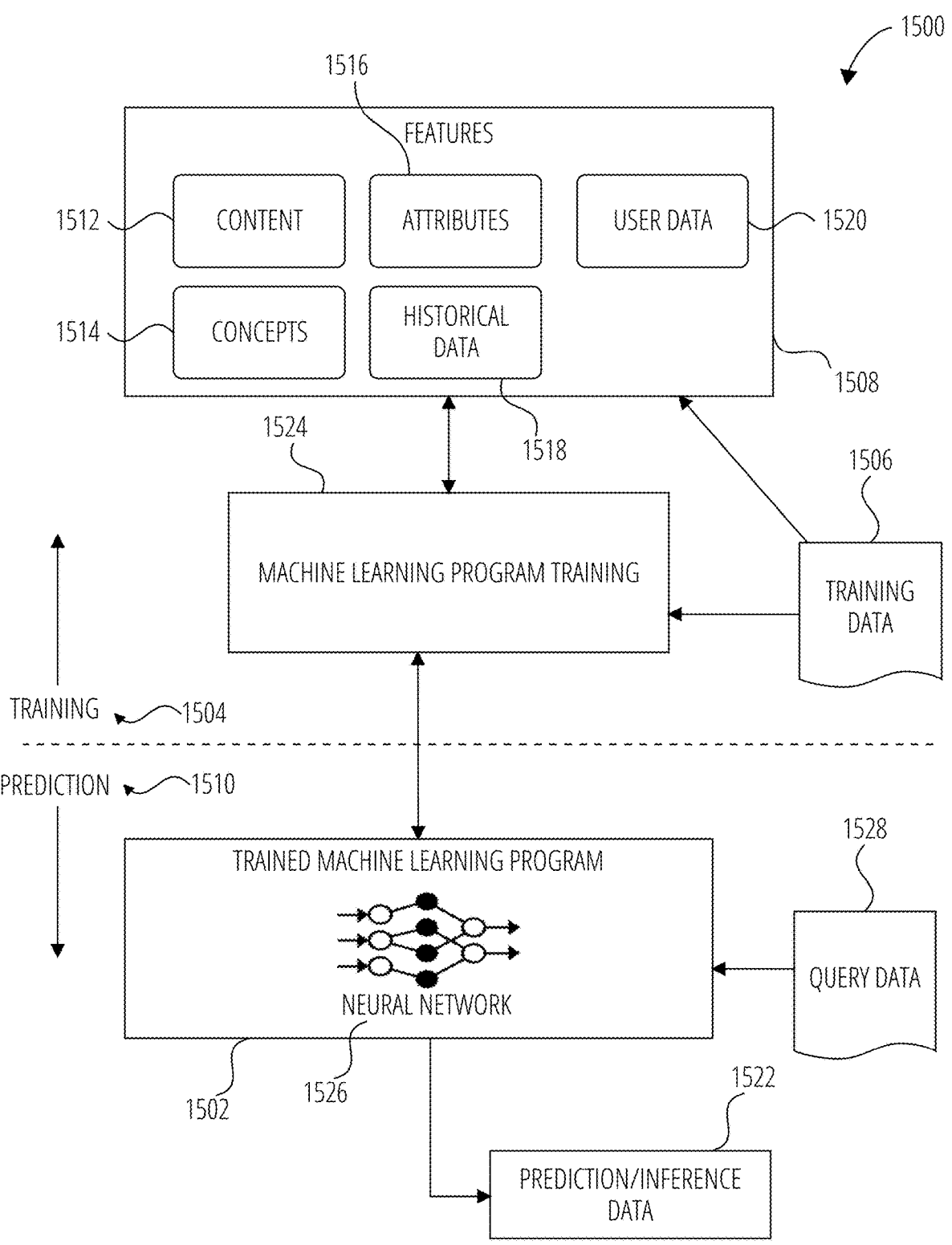
FIG. 15 diagrammatically illustrates training and use of a machine learning program, according to some examples.

FIG. 15 illustrates further details of two example phases, namely a training phase 1504 (e.g., part of model selection and training 1406) and a prediction phase 1510 (part of prediction 1410). Prior to the training phase 1504, feature engineering 1404 is used to identify features 1508. This may include identifying informative, discriminating, and independent features for effectively operating the trained machine learning program 1502 in pattern recognition, classification, and regression. In some examples, the training data 1506 includes labeled data, known for pre-identified features 1508 and one or more outcomes. Each of the features 1508 may be a variable or attribute, such as an individual measurable property of a process, article, system, or phenomenon represented by a data set (e.g., the training data 1506). Features 1508 may also be of different types, such as numeric features, strings, and graphs, and may include one or more of content 1512, concepts 1514, attributes 1516, historical data 1518, and/or user data 1520, merely for example.

In training phase 1504, the machine learning program may use the training data 1506 to find correlations among the features 1508 that affect a predicted outcome or prediction/inference data 1522. With the training data 1506 and the identified features 1508, the trained machine learning program 1502 is trained during the training phase 1504 during machine learning program training 1524. The machine learning program training 1524 appraises values of the features 1508 as they correlate to the training data 1506. The result of the training is the trained machine learning program 1502 (e.g., a trained or learned model).

Further, the training phase 1504 may involve machine learning, in which the training data 1506 is structured (e.g., labeled during preprocessing operations). The trained machine learning program 1502 may implement a neural network 1526 capable of performing, for example, classification or clustering operations. In other examples, the training phase 1504 may involve deep learning, in which the training data 1506 is unstructured, and the trained machine learning program 1502 implements a deep neural network 1526 that can perform both feature extraction and classification/clustering operations.

In some examples, a neural network 1526 may be generated during the training phase 1504, and implemented within the trained machine learning program 1502. The neural network 1526 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 1526 may operationally compute a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 1526 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example. Some machine learning models may include multiple neural networks 1526.

In addition to the training phase 1504, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In the prediction phase 1510, the trained machine learning program 1502 uses the features 1508 for analyzing query data 1528 to generate inferences, outcomes, or predictions, as examples of a prediction/inference data 1522. For example, during the prediction phase 1510, the trained machine learning program 1502 generates an output. Query data 1528 is provided as an input to the trained machine learning program 1502, and the trained machine learning program 1502 generates the prediction/inference data 1522 as output, responsive to receipt of the query data 1528.

In some examples, the trained machine learning program 1502 may be a generative artificial intelligence (AI) model. Generative AI is a term that may refer to any type of artificial intelligence that can create new content. For example, generative AI can produce text, images, video, audio, code, or synthetic data. In some examples, the generated content may be similar to the original data, but not identical.

Some of the techniques that may be used in generative AI are:

CNNs: CNNs may be used for image recognition and computer vision tasks. CNNs may, for example, be designed to extract features from images by using filters or kernels that scan the input image and highlight important patterns.

RNNs: RNNs may be used for processing sequential data, such as speech, text, and time series data, for example. RNNs employ feedback loops that allow them to capture temporal dependencies and remember past inputs.

GANs: GANs may include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.

Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code.

In generative AI examples, the prediction/inference data 1522 may include predictions, translations, summaries, answers, media content, or combinations thereof.

In some examples, once a model has been trained (e.g., on a large training dataset), the model may be fine-tuned on a smaller dataset that is more specific to the problem at hand. The machine learning pipeline 1400 may thus return to the model selection and training 1406 phase, even after deployment 1414, for a fine-tuning process. For example, a computer vision model can be fine-tuned on a dataset of medical images to create a model for medical image classification. Fine-tuning may take the pretrained model as a starting point and further train it on the new dataset, often with a lower learning rate and smaller number of epochs. This allows the model to adapt its learned feature representations to the new dataset. The pre-trained weights are updated during fine-tuning to better fit the new data, rather than training a new model "from scratch." This transfer of knowledge from the pretraining dataset may lead to better performance compared to a model trained only on the smaller dataset. The machine learning pipeline 1400 may then again proceed to model evaluation 1408 to evaluate the fine-tuned model, before deploying it.

Examples described herein may utilize visual-semantic machine learning models. In some examples, a visual-semantic machine learning model consists of an image encoder, a text encoder, and means to fuse information from the two encoders. The image and text encoders may use transformer architectures. As mentioned above, BLIP and BLIP-2 are non-limiting examples of visual-semantic machine learning models with multimodal capabilities.

Data Communications Architecture

Figure 16:
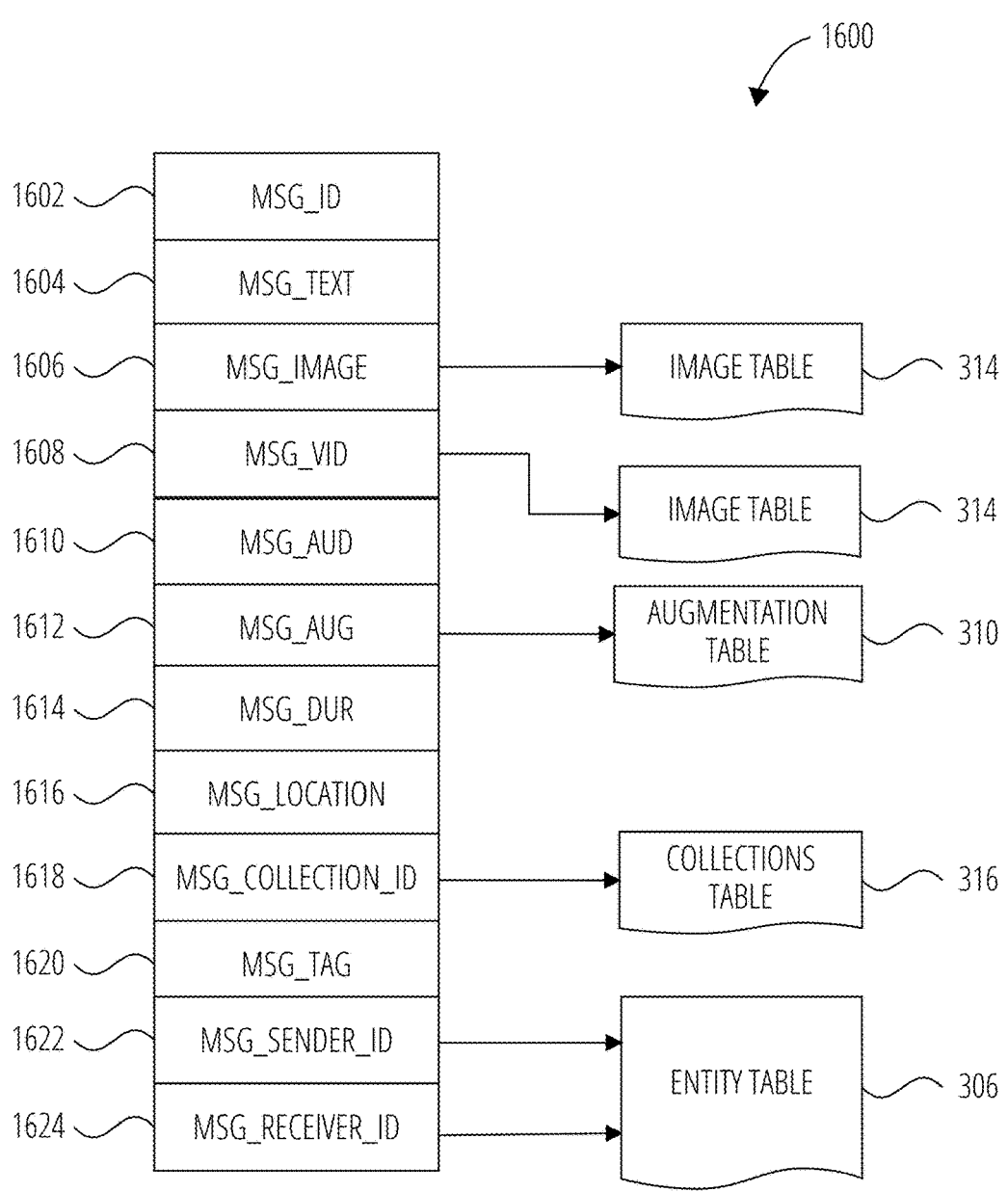
FIG. 16 is a diagrammatic representation of a message, according to some examples.

FIG. 16 is a schematic diagram illustrating a structure of a message 1600, according to some examples, generated by an interaction client 104 for communication to a further interaction client 104 via the interaction servers 124. The content of a particular message 1600 may be used to populate the message table 304 stored within the database 128 of FIG. 1, accessible by the interaction servers 124. Similarly, the content of a message 1600 may be stored in memory as "in-transit" or "in-flight" data of the user system 102 or the interaction servers 124. A message 1600 is shown to include the following example components:

Message identifier 1602: a unique identifier that identifies the message 1600.

Message text payload 1604: text, to be generated by a user via a user interface of the user system 102, and that is included in the message 1600.

Message image payload 1606: image data, captured by a camera component of a user system 102 or retrieved from a memory component of a user system 102, and that is included in the message 1600. Image data for a sent or received message 1600 may be stored in the image table 314.

Message video payload 1608: video data, captured by a camera component or retrieved from a memory component of the user system 102, and that is included in the message 1600. Video data for a sent or received message 1600 may be stored in the image table 314.

Message audio payload 1610: audio data, captured by a microphone or retrieved from a memory component of the user system 102, and that is included in the message 1600.

Message augmentation data 1612: augmentation data (e.g., filters, stickers, or other annotations or enhancements) that represents augmentations or AR effects to be applied to message image payload 1606, message video payload 1608, or message audio payload 1610 of the message 1600. Augmentation data for a sent or received message 1600 may be stored in the augmentation table 310.

Message duration parameter 1614: parameter value indicating, in seconds, the amount of time for which content of the message (e.g., the message image payload 1606, message video payload 1608, message audio payload 1610) is to be presented or made accessible to a user via the interaction client 104.

Message geolocation parameter 1616: geolocation data (e.g., latitudinal and longitudinal coordinates) associated with the content payload of the message. Multiple message geolocation parameter 1616 values may be included in the payload, each of these parameter values being associated with respect to content items included in the content (e.g., a specific image within the message image payload 1606, or a specific video in the message video payload 1608).

Message collection identifier 1618: identifier values identifying one or more content collections (e.g., "stories" identified in the collections table 316) with which a particular content item in the message image payload 1606 of the message 1600 is associated. For example, multiple images within the message image payload 1606 may each be associated with multiple content collections using identifier values.

Message tag 1620: each message 1600 may be tagged with multiple tags, each of which is indicative of the subject matter of content included in the message payload. For example, where a particular image included in the message image payload 1606 depicts an animal (e.g., a lion), a tag value may be included within the message tag 1620 that is indicative of the relevant animal. Tag values may be generated manually, based on user input, or may be automatically generated using, for example, image recognition.

Message sender identifier 1622: an identifier (e.g., a messaging system identifier, email address, or device identifier) indicative of a user of the user system 102 on which the message 1600 was generated and from which the message 1600 was sent.

Message receiver identifier 1624: an identifier (e.g., a messaging system identifier, email address, or device identifier) indicative of a user of the user system 102 to which the message 1600 is addressed.

The contents (e.g., values) of the various components of message 1600 may be pointers to locations in tables within which content data values are stored. For example, an image value in the message image payload 1606 may be a pointer to (or address of) a location within an image table 314. Similarly, values within the message video payload 1608 may point to data stored within an image table 314, values stored within the message augmentation data 1612 may point to data stored in an augmentation table 310, values stored within the message collection identifier 1618 may point to data stored in a collections table 316, and values stored within the message sender identifier 1622 and the message receiver identifier 1624 may point to user records stored within an entity table 306.

Figure 17:
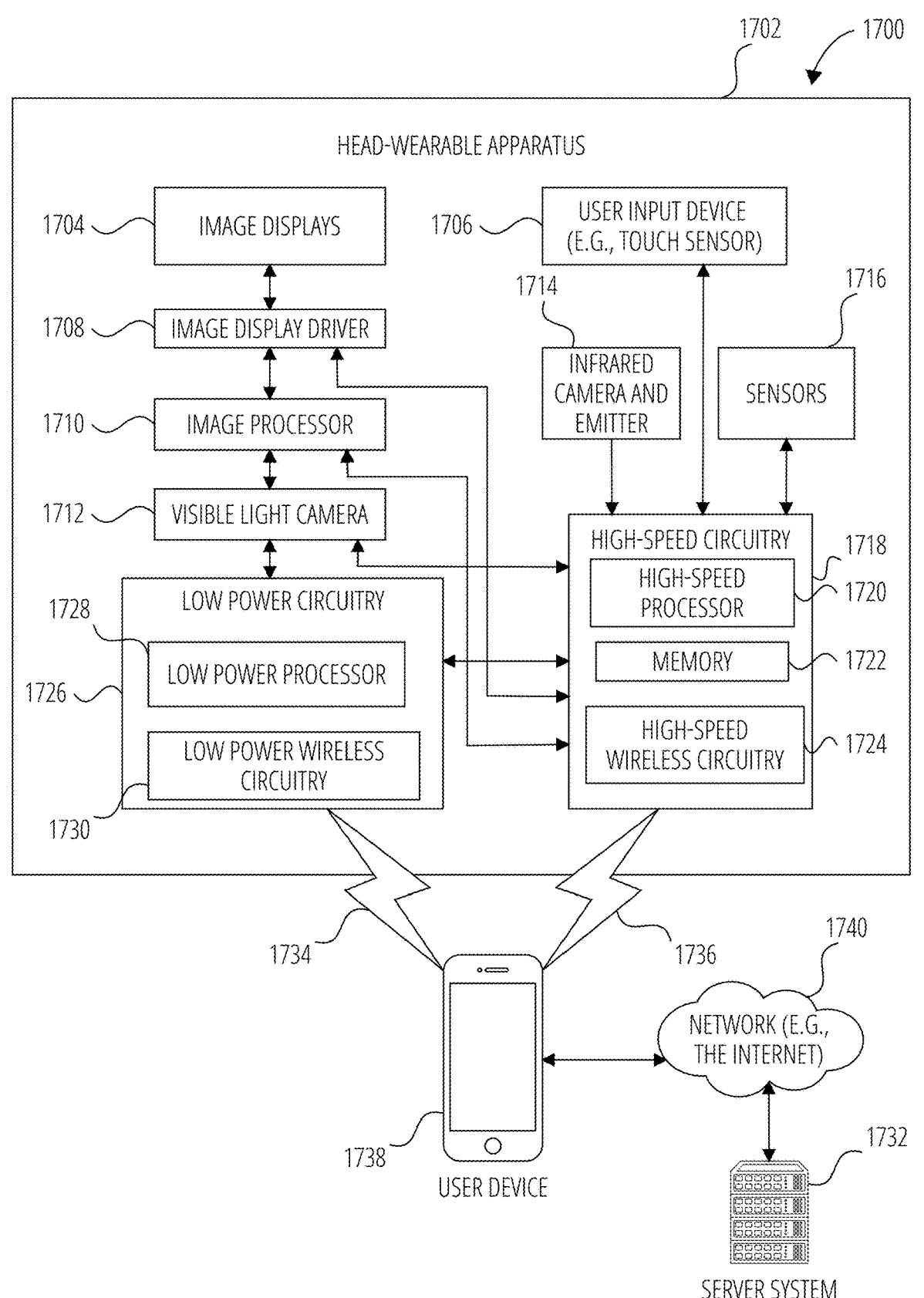
FIG. 17 illustrates a network environment in which a head-wearable apparatus can be implemented, according to some examples.

FIG. 17 illustrates a network environment 1700 in which a head-wearable apparatus 1702, e.g., a head-wearable XR or AR device, can be implemented according to some examples. FIG. 17 provides a high-level functional block diagram of an example head-wearable apparatus 1702 communicatively coupled to a mobile user device 1738 and a server system 1732 via a suitable network 1740. One or more of the techniques described herein may be performed using the head-wearable apparatus 1702 or a network of devices similar to those shown in FIG. 17.

The head-wearable apparatus 1702 includes a camera, such as at least one of a visible light camera 1712 and an infrared camera and emitter 1714. The head-wearable apparatus 1702 includes other sensors 1716, such as motion sensors or eye tracking sensors. The user device 1738 can be capable of connecting with head-wearable apparatus 1702 using both a communication link 1734 and a communication link 1736. The user device 1738 is connected to the server system 1732 via the network 1740. The network 1740 may include any combination of wired and wireless connections.

The head-wearable apparatus 1702 includes a display arrangement that has several components. The arrangement includes two image displays 1704 of an optical assembly. However, in other examples, the head-wearable apparatus 1702 may include one image display or more than two image displays.

The two displays include one associated with the left lateral side and one associated with the right lateral side of the head-wearable apparatus 1702. The head-wearable apparatus 1702 also includes an image display driver 1708, an image processor 1710, low power circuitry 1726, and high-speed circuitry 1718. The image displays 1704 are for presenting images and videos, including an image that can provide a graphical user interface to a user of the head-wearable apparatus 1702.

The image display driver 1708 commands and controls the image display of each of the image displays 1704. The image display driver 1708 may deliver image data directly to each image display of the image displays 1704 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 1702 may include a frame and stems (or temples) extending from a lateral side of the frame, or another component to facilitate wearing of the head-wearable apparatus 1702 by a user. The head-wearable apparatus 1702 of FIG. 17 further includes a user input device 1706 (e.g., touch sensor or push button) including an input surface on the head-wearable apparatus 1702. The user input device 1706 is configured to receive, from the user, an input selection to manipulate the graphical user interface of the presented image.

The components shown in FIG. 17 for the head-wearable apparatus 1702 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 1702. Left and right sides of the head-wearable apparatus 1702 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1702 includes a memory 1722 which stores instructions to perform a subset or all of the functions described herein. The memory 1722 can also include a storage device. As further shown in FIG. 17, the high-speed circuitry 1718 includes a high-speed processor 1720, the memory 1722, and high-speed wireless circuitry 1724. In FIG. 17, the image display driver 1708 is coupled to the high-speed circuitry 1718 and operated by the high-speed processor 1720 in order to drive the left and right image displays of the image displays 1704. The high-speed processor 1720 may be any processor capable of managing high-speed communications and operation of any general computing system needed for the head-wearable apparatus 1702. The high-speed processor 1720 includes processing resources needed for managing high-speed data transfers over the communication link 1736 to a wireless local area network (WLAN) using high-speed wireless circuitry 1724. In certain examples, the high-speed processor 1720 executes an operating system such as a LINUX operating system or other such operating system of the head-wearable apparatus 1702 and the operating system is stored in memory 1722 for execution. In addition to any other responsibilities, the high-speed processor 1720 executing a software architecture for the head-wearable apparatus 1702 is used to manage data transfers with high-speed wireless circuitry 1724. In certain examples, high-speed wireless circuitry 1724 is configured to implement Institute of Electrical and Electronic Engineers (IEEE) 1702.11 communication standards, also referred to herein as Wi-Fi™. In other examples, other high-speed communications standards may be implemented by high-speed wireless circuitry 1724.

The low power wireless circuitry 1730 and the high-speed wireless circuitry 1724 of the head-wearable apparatus 1702 can include short range transceivers (Bluetooth™) and wireless wide, local, or wide area network transceivers (e.g., cellular or Wi-Fi™). The user device 1738, including the transceivers communicating via the communication link 1734 and communication link 1736, may be implemented using details of the architecture of the head-wearable apparatus 1702, as can other elements of the network 1740.

The memory 1722 includes any storage device capable of storing various data and applications, including, among other things, camera data generated by the visible light camera 1712, sensors 1716, and the image processor 1710, as well as images generated for display by the image display driver 1708 on the image displays 1704. While the memory 1722 is shown as integrated with the high-speed circuitry 1718, in other examples, the memory 1722 may be an independent standalone element of the head-wearable apparatus 1702. In certain such examples, electrical routing lines may provide a connection through a chip that includes the high-speed processor 1720 from the image processor 1710 or low power processor 1728 to the memory 1722. In other examples, the high-speed processor 1720 may manage addressing of memory 1722 such that the low power processor 1728 will boot the high-speed processor 1720 any time that a read or write operation involving memory 1722 is needed.

As shown in FIG. 17, the low power processor 1728 or high-speed processor 1720 of the head-wearable apparatus 1702 can be coupled to the camera (visible light camera 1712, or infrared camera and emitter 1714), the image display driver 1708, the user input device 1706 (e.g., touch sensor or push button), and the memory 1722. The head-wearable apparatus 1702 also includes sensors 1716, which may be the motion components 1830, position components 1834, environmental components 1832, and biometric components 1828, e.g., as described below with reference to FIG. 18. In particular, motion components 1830 and position components 1834 are used by the head-wearable apparatus 1702 to determine and keep track of the position and orientation (the "pose") of the head-wearable apparatus 1702 relative to a frame of reference or another object, in conjunction with a video feed from one of the visible light cameras 1712, using for example techniques such as structure from motion (SfM) or VIO.

In some examples, and as shown in FIG. 17, the head-wearable apparatus 1702 is connected with a host computer. For example, the head-wearable apparatus 1702 is paired with the user device 1738 via the communication link 1736 or connected to the server system 1732 via the network 1740. The server system 1732 may be one or more computing devices as part of a service or network computing system, for example, that include a processor, a memory, and network communication interface to communicate over the network 1740 with the user device 1738 and head-wearable apparatus 1702.

The user device 1738 includes a processor and a network communication interface coupled to the processor. The network communication interface allows for communication over the network 1740, communication link 1734 or communication link 1736. The user device 1738 can further store at least portions of the instructions for implementing functionality described herein.

Output components of the head-wearable apparatus 1702 include visual components, such as a display (e.g., one or more liquid-crystal display (LCD)), one or more plasma display panel (PDP), one or more light emitting diode (LED) display, one or more projector, or one or more waveguide. The image displays 1704 of the optical assembly are driven by the image display driver 1708. The output components of the head-wearable apparatus 1702 further include acoustic components (e.g., speakers), haptic components (e.g., a vibratory motor), other signal generators, and so forth. The input components of the head-wearable apparatus 1702, the user device 1738, and server system 1732, such as the user input device 1706, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1702 may optionally include additional peripheral device elements. Such peripheral device elements may include biometric sensors, additional sensors, or display elements integrated with the head-wearable apparatus 1702. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 1736 from the user device 1738 via the low power wireless circuitry 1730 or high-speed wireless circuitry 1724.

Machine Architecture

Figure 18:
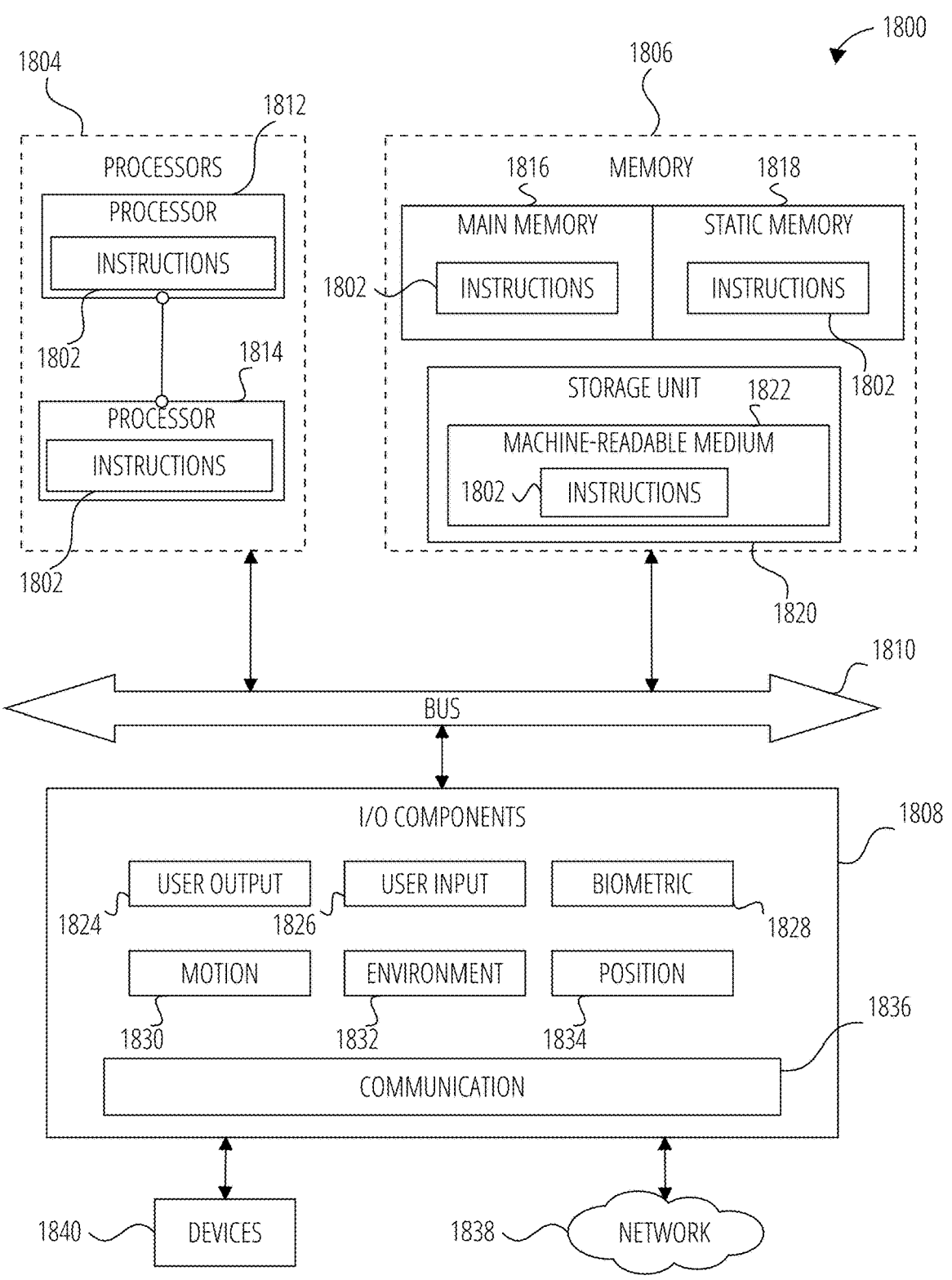
FIG. 18 is a diagrammatic representation of a machine in the form of a computer system within which a set of instructions may be executed to cause the machine to perform any one or more of the methodologies discussed herein, according to some examples.

FIG. 18 is a diagrammatic representation of a machine 1800 within which instructions 1802 (e.g., software, a program, an application, an applet, an app, or other executable code) for causing the machine 1800 to perform any one or more of the methodologies discussed herein may be executed. For example, the instructions 1802 may cause the machine 1800 to execute any one or more of the methods described herein. The instructions 1802 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), an AR device, an XR device, a virtual reality (VR) device, a smart home device (e.g., a smart appliance), other smart devices, a web appliance, a network router, a network switch, a network bridge, or any machine capable of executing the instructions 1802, sequentially or otherwise, that specify actions to be taken by the machine 1800. Further, while a single machine 1800 is illustrated, the term "machine" shall also be taken to include a collection of machines that individually or jointly execute the instructions 1802 to perform any one or more of the methodologies discussed herein. The machine 1800, for example, may comprise the user system 102 or any one of multiple server devices forming part of the interaction server system 110. In some examples, the machine 1800 may also comprise both client and server systems, with certain operations of a particular method or algorithm being performed on the server-side and with certain operations of the particular method or algorithm being performed on the client-side.

The machine 1800 may include processors 1804, memory 1806, and input/output I/O components 1808, which may be configured to communicate with each other via a bus 1810. In an example, the processors 1804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1812 and a processor 1814 that execute the instructions 1802. The term "processor" is intended to include multi-core processors that may comprise two or more independent processors (sometimes referred to as "cores") that may execute instructions contemporaneously. Although FIG. 18 shows multiple processors 1804, the machine 1800 may include a single processor with a single-core, a single processor with multiple cores (e.g., a multi-core processor), multiple processors with a single core, multiple processors with multiples cores, or any combination thereof.

The memory 1806 includes a main memory 1816, a static memory 1818, and a storage unit 1820, both accessible to the processors 1804 via the bus 1810. The main memory 1806, the static memory 1818, and storage unit 1820 store the instructions 1802 embodying any one or more of the methodologies or functions described herein. The instructions 1802 may also reside, completely or partially, within the main memory 1816, within the static memory 1818, within machine-readable medium 1822 within the storage unit 1820, within at least one of the processors 1804 (e.g., within the processor's cache memory), or any suitable combination thereof, during execution thereof by the machine 1800.

The I/O components 1808 may include a wide variety of components to receive input, provide output, produce output, transmit information, exchange information, capture measurements, and so on. The specific I/O components 1808 that are included in a particular machine will depend on the type of machine. For example, portable machines such as mobile phones may include a touch input device or other such input mechanisms, while a headless server machine will likely not include such a touch input device. It will be appreciated that the I/O components 1808 may include many other components that are not shown in FIG. 18. In various examples, the I/O components 1808 may include user output components 1824 and user input components 1826. The user output components 1824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1808 may include biometric components 1828, motion components 1830, environmental components 1832, or position components 1834, among a wide array of other components. For example, the biometric components 1828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components 1830 include acceleration sensor components (e.g., accelerometer), gravitation sensor components, rotation sensor components (e.g., gyroscope).

The environmental components 1832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 1834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1808 further include communication components 1836 operable to couple the machine 1800 to a network 1838 or devices 1840 via respective coupling or connections. For example, the communication components 1836 may include a network interface component or another suitable device to interface with the network 1838. In further examples, the communication components 1836 may include wired communication components, wireless communication components, cellular communication components, Near Field Communication (NFC) components, Bluetooth™ components (e.g., Bluetooth™ Low Energy), Wi-Fi components, and other communication components to provide communication via other modalities. The devices 1840 may be another machine or any of a wide variety of peripheral devices (e.g., a peripheral device coupled via a USB).

Moreover, the communication components 1836 may detect identifiers or include components operable to detect identifiers. For example, the communication components 1836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1836, such as location via Internet Protocol (IP) geolocation, location via Wi-Fi® signal triangulation, location via detecting an NFC beacon signal that may indicate a particular location, and so forth.

The various memories (e.g., main memory 1816, static memory 1818, and memory of the processors 1804) and storage unit 1820 may store one or more sets of instructions and data structures (e.g., software) embodying or used by any one or more of the methodologies or functions described herein. These instructions (e.g., the instructions 1802), when executed by processors 1804, may cause various operations to implement the disclosed examples.

The instructions 1802 may be transmitted or received over the network 1838, using a transmission medium, via a network interface device (e.g., a network interface component included in the communication components 1836) and using any one of several well-known transfer protocols (e.g., hypertext transfer protocol (HTTP)). Similarly, the instructions 1802 may be transmitted or received using a transmission medium via a coupling (e.g., a peer-to-peer coupling) to the devices 1840.

Software Architecture

Figure 19:
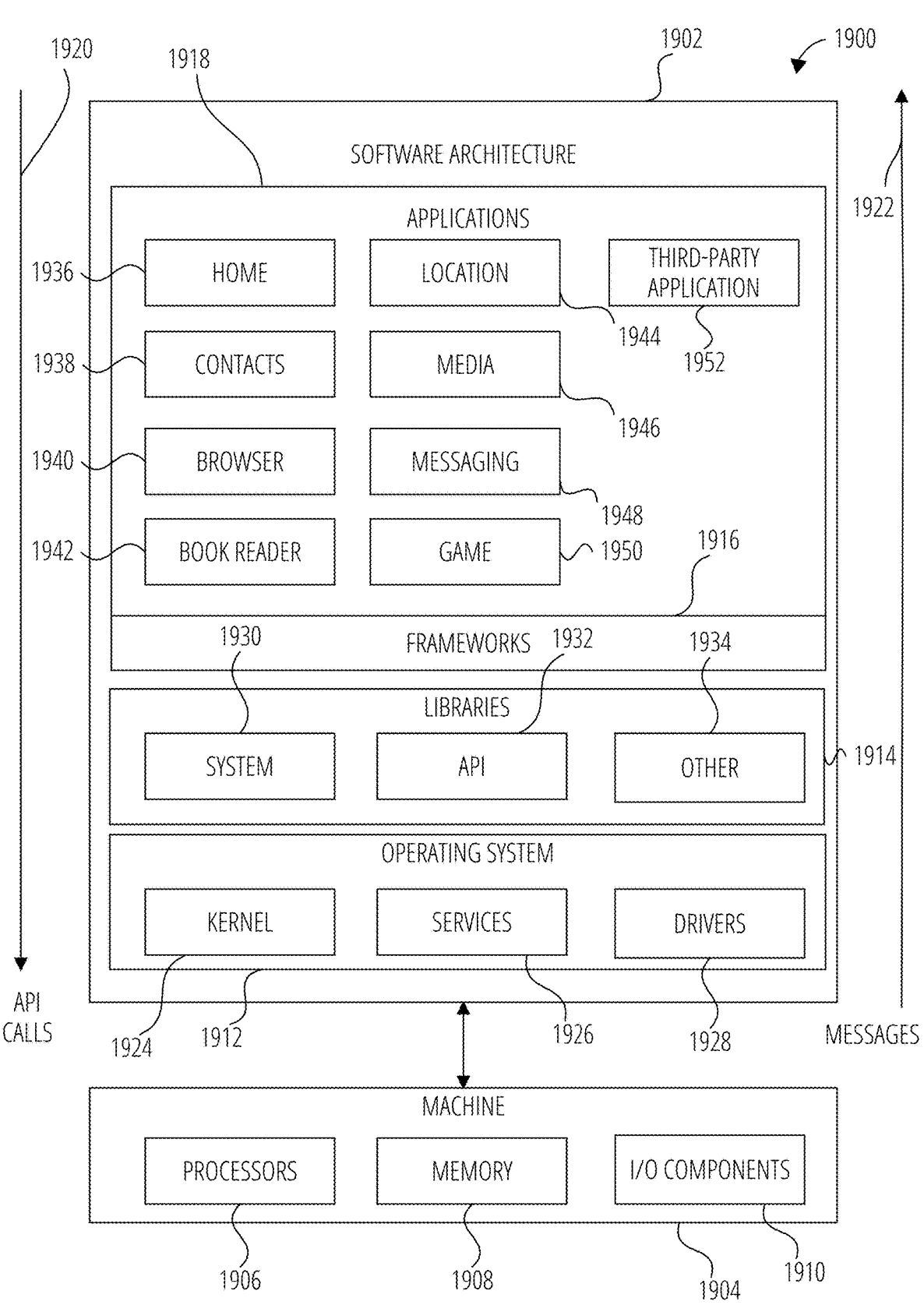
FIG. 19 is a block diagram showing a software architecture within which examples may be implemented.

FIG. 19 is a block diagram 1900 illustrating a software architecture 1902, which can be installed on any one or more of the devices described herein. The software architecture 1902 is supported by hardware such as a machine 1904 that includes processors 1906, memory 1908, and I/O components 1910. In this example, the software architecture 1902 can be conceptualized as a stack of layers, where each layer provides a particular functionality. The software architecture 1902 includes layers such as an operating system 1912, libraries 1914, frameworks 1916, and applications 1918. Operationally, the applications 1918 invoke API calls 1920 through the software stack and receive messages 1922 in response to the API calls 1920.

The operating system 1912 manages hardware resources and provides common services. The operating system 1912 includes, for example, a kernel 1924, services 1926, and drivers 1928. The kernel 1924 acts as an abstraction layer between the hardware and the other software layers. For example, the kernel 1924 provides memory management, processor management (e.g., scheduling), component management, networking, and security settings, among other functionalities. The services 1926 can provide other common services for the other software layers. The drivers 1928 are responsible for controlling or interfacing with the underlying hardware. For instance, the drivers 1928 can include display drivers, camera drivers, Bluetooth™ or Bluetooth™ Low Energy drivers, flash memory drivers, serial communication drivers (e.g., USB drivers), WI-FI drivers, audio drivers, power management drivers, and so forth.

The libraries 1914 provide a common low-level infrastructure used by the applications 1918. The libraries 1914 can include system libraries 1930 (e.g., C standard library) that provide functions such as memory allocation functions, string manipulation functions, mathematic functions, and the like. In addition, the libraries 1914 can include API libraries 1932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1914 can also include a wide variety of other libraries 1934 to provide many other APIs to the applications 1918.

The frameworks 1916 provide a common high-level infrastructure that is used by the applications 1918. For example, the frameworks 1916 provide various graphical user interface (GUI) functions, high-level resource management, and high-level location services. The frameworks 1916 can provide a broad spectrum of other APIs that can be used by the applications 1918, some of which may be specific to a particular operating system or platform.

In an example, the applications 1918 may include a home application 1936, a contacts application 1938, a browser application 1940, a book reader application 1942, a location application 1944, a media application 1946, a messaging application 1948, a game application 1950, and a broad assortment of other applications such as a third-party application 1952. The applications 1918 are programs that execute functions defined in the programs. Various programming languages can be employed to create one or more of the applications 1918, structured in a variety of manners, such as object-oriented programming languages (e.g., Objective-C, Java, or C++) or procedural programming languages (e.g., C or assembly language). In a specific example, the third-party application 1952 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 1952 can invoke the API calls 1920 provided by the operating system 1912 to facilitate functionalities described herein.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: accessing a first input image and a second input image, the second input image generated by applying a target augmented reality (AR) effect to the first input image; providing the first input image and the second input image to a first visual-semantic machine learning model to obtain output describing at least one feature of the target AR effect, the first visual-semantic machine learning model being fine-tuned from a second visual-semantic machine learning model on training data comprising a plurality of training samples, each training sample comprising a first training image, a second training image, and a training description of a given AR effect, and the second training image being generated by applying the given AR effect to the first training image; selecting, based on the output of the first visual-semantic machine learning model, a description of the target AR effect; and storing the description of the target AR effect in association with an identifier of the target AR effect.

In Example 2, the subject matter of Example 1 includes, wherein fine-tuning of the second visual-semantic machine learning model comprises using the training samples to adapt a transformer of the second visual-semantic machine learning model to obtain the first visual-semantic machine learning model.

In Example 3, the subject matter of Example 2 includes, wherein the transformer is between an image encoder and a large language model of the first visual-semantic machine learning model, the first visual-semantic machine learning model being fine-tuned by adapting attention parameters of the transformer while keeping the image encoder and the large language model fixed.

In Example 4, the subject matter of any of Examples 2-3 includes, wherein the second visual-semantic machine learning model is fine-tuned by Low-Rank Adaptation (LoRA).

In Example 5, the subject matter of any of Examples 1-4 includes, wherein the at least one feature comprises at least one visual feature, the first visual-semantic machine learning model being fine-tuned to describe the at least one visual feature based on a visual transition from the first input image to the second input image, as caused by the target AR effect.

In Example 6, the subject matter of any of Examples 1-5 includes, wherein the first visual-semantic machine learning model uses the first input image and the second input image to perform a captioning operation that is AR effect-specific.

In Example 7, the subject matter of any of Examples 1-6 includes, the operations further comprising: applying the target AR effect to the first input image to obtain the second input image.

In Example 8, the subject matter of any of Examples 1-7 includes, wherein the first input image and the second input image are provided to the first visual-semantic machine learning model as a concatenated image.

In Example 9, the subject matter of Example 8 includes, the operations further comprising: generating the concatenated image by concatenating the first input image and the second input image.

In Example 10, the subject matter of Example 9 includes, wherein the concatenating of the first input image and the second input image comprises positioning the first input image and the second input image relative to each other in a predetermined spatial arrangement to obtain the concatenated image.

In Example 11, the subject matter of any of Examples 1-10 includes, wherein, for each training sample, the first training image and the second training image are concatenated into a concatenated training image.

In Example 12, the subject matter of any of Examples 1-11 includes, wherein the first input image is a frame of a base video and the second input image is a frame of an augmented video, the augmented video generated by rendering the target AR effect on the base video.

In Example 13, the subject matter of Example 12 includes, the operations further comprising: identifying the frame of the augmented video as temporally corresponding to the frame of the base video; extracting the frame of the base video to obtain the first input image; and extracting the frame of the augmented video to obtain the second input image.

In Example 14, the subject matter of any of Examples 1-13 includes, wherein the description of the target AR effect is a natural language text description, and the storing of the description of the target AR effect comprises: indexing, in an interaction system, the target AR effect based on the description of the target AR effect.

In Example 15, the subject matter of Example 14 includes, the operations further comprising: receiving, from a user device of a user of the interaction system, a search query; matching, based on the indexing of the target AR effect, the target AR effect with the search query; detecting user selection of the target AR effect; and in response to the matching of the target AR effect with the search query and the user selection of the target AR effect, causing presentation of image data at the user device, the target AR effect being applied to the image data.

In Example 16, the subject matter of any of Examples 1-15 includes, the operations further comprising: determining, based on the description of the target AR effect, a category of the target AR effect; and storing the category of the target AR effect in association with the identifier of the target AR effect.

In Example 17, the subject matter of any of Examples 1-16 includes, wherein the target AR effect is one of a plurality of AR effects supported by an interaction system, and the first visual-semantic machine learning model is used to generate descriptions of each of the plurality of AR effects.

In Example 18, the subject matter of Example 17 includes, wherein the storing of the description of the target AR effect in association with the identifier of the target AR effect comprises storing the description of the target AR effect in a database that maps each of the plurality of AR effects to a respective description.

Example 19 is a method comprising: accessing a first input image and a second input image, the second input image generated by applying a target augmented reality (AR) effect to the first input image; providing the first input image and the second input image to a first visual-semantic machine learning model to obtain output describing at least one feature of the target AR effect, the first visual-semantic machine learning model being fine-tuned from a second visual-semantic machine learning model on training data comprising a plurality of training samples, each training sample comprising a first training image, a second training image, and a training description of a given AR effect, and the second training image being generated by applying the given AR effect to the first training image; selecting, based on the output of the first visual-semantic machine learning model, a description of the target AR effect; and storing the description of the target AR effect in association with an identifier of the target AR effect.

Example 20 is a non-transitory computer-readable storage medium storing instructions that, when executed by at least one processor, cause the at least one processor to perform operations comprising: accessing a first input image and a second input image, the second input image generated by applying a target augmented reality (AR) effect to the first input image; providing the first input image and the second input image to a first visual-semantic machine learning model to obtain output describing at least one feature of the target AR effect, the first visual-semantic machine learning model being fine-tuned from a second visual-semantic machine learning model on training data comprising a plurality of training samples, each training sample comprising a first training image, a second training image, and a training description of a given AR effect, and the second training image being generated by applying the given AR effect to the first training image; selecting, based on the output of the first visual-semantic machine learning model, a description of the target AR effect; and storing the description of the target AR effect in association with an identifier of the target AR effect.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

CONCLUSION

As used in this disclosure, the term "machine learning model" (or simply "model") may refer to a single, stand-alone model, or a combination of models. The term may also refer to a system, component or module that includes a machine learning model together with one or more supporting or supplementary components that do not necessarily perform machine learning tasks.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

The term "operation" is used to refer to elements in the drawings of this disclosure for ease of reference and it will be appreciated that each "operation" may identify one or more operations, processes, actions, or steps, and may be performed by one or multiple components.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device," refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology ($1\times$RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"User device" refers, for example, to a device accessed, controlled, or owned by a user and with which the user interacts to perform an action, or interaction on the user device, including an interaction with other users or computer systems.

What is claimed is:

1. A system comprising:

at least one processor; and at least one memory component storing instructions that, when executed by the at least one processor, cause the at least one processor to perform operations comprising:

accessing a first input image and a second input image, the second input image generated by applying a target augmented reality (AR) effect to the first input image;

providing the first input image and the second input image to a first visual-semantic machine learning model to obtain output describing at least one feature of the target AR effect, the first visual-semantic machine learning model being fine-tuned from a second visual-semantic machine learning model on training data comprising a plurality of training samples, each training sample comprising a first training image, a second training image, and a training description of a given AR effect, and the second training image being generated by applying the given AR effect to the first training image;

selecting, based on the output of the first visual-semantic machine learning model, a description of the target AR effect;

storing the description of the target AR effect in association with an identifier of the target AR effect, the storing comprising indexing the target AR effect based on the description of the target AR effect;

receiving from a user device of a user, a search query;

matching, based on the indexing of the target AR effect, the target AR effect with the search query;

detecting user selection of the target AR effect; and based on the matching of the target AR effect with the search query and the user selection of the target AR effect, causing presentation of image data at the user device, the target AR effect being applied to the image data.

2. The system of claim 1, wherein fine-tuning of the second visual-semantic machine learning model comprises using the training samples to adapt a transformer of the second visual-semantic machine learning model to obtain the first visual-semantic machine learning model.

3. The system of claim 2, wherein the transformer is between an image encoder and a large language model of the first visual-semantic machine learning model, the first visual-semantic machine learning model being fine-tuned by adapting attention parameters of the transformer while keeping the image encoder and the large language model fixed.

4. The system of claim 2, wherein the second visual-semantic machine learning model is fine-tuned by Low-Rank Adaptation (LoRA).

5. The system of claim 1, wherein the at least one feature comprises at least one visual feature, the first visual-semantic machine learning model being fine-tuned to describe the at least one visual feature based on a visual transition from the first input image to the second input image, as caused by the target AR effect.

6. The system of claim 1, wherein the first visual-semantic machine learning model uses the first input image and the second input image to perform a captioning operation that is AR effect-specific.

7. The system of claim 1, the operations further comprising:

applying the target AR effect to the first input image to obtain the second input image.

8. The system of claim 1, wherein the first input image and the second input image are provided to the first visual-semantic machine learning model as a concatenated image.

9. The system of claim 8, the operations further comprising:

generating the concatenated image by concatenating the first input image and the second input image.

10. The system of claim 9, wherein the concatenating of the first input image and the second input image comprises positioning the first input image and the second input image relative to each other in a predetermined spatial arrangement to obtain the concatenated image.

11. The system of claim 1, wherein, for each training sample, the first training image and the second training image are concatenated into a concatenated training image.

12. The system of claim 1, wherein the first input image is a frame of a base video and the second input image is a frame of an augmented video, the augmented video generated by rendering the target AR effect on the base video.

13. The system of claim 12, the operations further comprising:

identifying the frame of the augmented video as temporally corresponding to the frame of the base video;

extracting the frame of the base video to obtain the first input image; and extracting the frame of the augmented video to obtain the second input image.

14. The system of claim 1, wherein the description of the target AR effect is a natural language text description.

15. The system of claim 1, the operations further comprising:

determining, based on the description of the target AR effect, a category of the target AR effect; and storing the category of the target AR effect in association with the identifier of the target AR effect.

16. The system of claim 1, wherein the target AR effect is one of a plurality of AR effects supported by an interaction system, and the first visual-semantic machine learning model is used to generate descriptions of each of the plurality of AR effects.

17. The system of claim 16, wherein the storing of the description of the target AR effect in association with the identifier of the target AR effect comprises storing the description of the target AR effect in a database that maps each of the plurality of AR effects to a respective description.

18. The system of claim 1, wherein the search query comprises one or more of a keyword, a tag, or the description of the target AR effect.

19. A method comprising:

accessing a first input image and a second input image, the second input image generated by applying a target augmented reality (AR) effect to the first input image;

providing the first input image and the second input image to a first visual-semantic machine learning model to obtain output describing at least one feature of the target AR effect, the first visual-semantic machine learning model being fine-tuned from a second visual-semantic machine learning model on training data comprising a plurality of training samples, each training sample comprising a first training image, a second training image, and a training description of a given AR effect, and the second training image being generated by applying the given AR effect to the first training image;

selecting, based on the output of the first visual-semantic machine learning model, a description of the target AR effect;

storing the description of the target AR effect in association with an identifier of the target AR effect, the storing comprising indexing the target AR effect based on the description of the target AR effect;

receiving, from a user device of a user, a search query;

matching, based on the indexing of the target AR effect, the target AR effect with the search query;

detecting user selection of the target AR effect; and based on the matching of the target AR effect with the search query and the user selection of the target AR effect, causing presentation of image data at the user device, the target AR effect being applied to the image data.

20. A non-transitory computer-readable storage medium storing instructions that, when executed by at least one processor, cause the at least one processor to perform operations comprising:

accessing a first input image and a second input image, the second input image generated by applying a target augmented reality (AR) effect to the first input image;

providing the first input image and the second input image to a first visual-semantic machine learning model to obtain output describing at least one feature of the target AR effect, the first visual-semantic machine learning model being fine-tuned from a second visual-semantic machine learning model on training data comprising a plurality of training samples, each training sample comprising a first training image, a second training image, and a training description of a given AR effect, and the second training image being generated by applying the given AR effect to the first training image;

selecting, based on the output of the first visual-semantic machine learning model, a description of the target AR effect;

storing the description of the target AR effect in association with an identifier of the target AR effect, the storing comprising indexing the target AR effect based on the description of the target AR effect;

receiving, from a user device of a user, a search query;

matching, based on the indexing of the target AR effect, the target AR effect with the search query;

detecting user selection of the target AR effect; and based on the matching of the target AR effect with the search query and the user selection of the target AR effect, causing presentation of image data at the user device, the target AR effect being applied to the image data.

* * * * *